US 8,264,506 B2

(12) United States Patent
Nagaraj et al.

(10) Patent No.: US 8,264,506 B2
(45) Date of Patent: Sep. 11, 2012

(54) SYSTEM AND METHOD FOR DISPLAYING A ROTATED IMAGE IN A DISPLAY DEVICE

(75) Inventors: Guruprasad Nagaraj, Bangalore (IN); Krishna Koteshwara Sridhar Murthy, Bangalore (IN); Vijayalaxmi Patil, Bangalore (IN); Nataraja Kambadahalli Muniyappa, Bangalore (IN); Sunil Ramappa Nyamagouda, Bangalore (IN)

(73) Assignee: LG Electronics Inc., Seoul (KR)

( * ) Notice: Subject to any disclaimer, the term of this patent is extended or adjusted under 35 U.S.C. 154(b) by 761 days.

(21) Appl. No.: 12/195,649

(22) Filed: Aug. 21, 2008

(65) Prior Publication Data
US 2009/0096814 A1 Apr. 16, 2009

Related U.S. Application Data

(60) Provisional application No. 60/969,825, filed on Sep. 4, 2007, provisional application No. 61/012,832, filed on Dec. 11, 2007, provisional application No. 61/043,490, filed on Apr. 9, 2008.

(51) Int. Cl.
G09G 5/00 (2006.01)

(52) U.S. Cl. .................. 345/659; 345/649

(58) Field of Classification Search ........ 345/659, 345/649
See application file for complete search history.

(56) References Cited

U.S. PATENT DOCUMENTS

| 3,976,982 | A | 8/1976 | Eiselen |
| 4,593,407 | A | 6/1986 | Konishi et al. |
| 4,757,302 | A * | 7/1988 | Hatakeyama et al. ..... 340/407.2 |
| 4,806,920 | A | 2/1989 | Sawada |
| 4,947,344 | A | 8/1990 | Hayashi et al. |
| 4,947,377 | A | 8/1990 | Hannai |
| 5,095,422 | A | 3/1992 | Horiguchi |
| 5,134,390 | A | 7/1992 | Kishimoto et al. |
| 5,189,404 | A | 2/1993 | Masimo et al. |
| 5,208,914 | A | 5/1993 | Wilson et al. |
| 5,329,289 | A | 7/1994 | Sakamoto et al. |
| 5,640,517 | A | 6/1997 | Parks et al. |
| 5,751,293 | A | 5/1998 | Hashimoto et al. ........... 345/430 |
| 5,973,664 | A * | 10/1999 | Badger ........................ 345/659 |
| 6,173,089 | B1 | 1/2001 | Van Lerberghe ............. 382/299 |
| 6,330,374 | B1 | 12/2001 | Yamaguchi et al. |
| 6,346,972 | B1 | 2/2002 | Kim |
| 6,405,280 | B1 | 6/2002 | Ryan |
| 6,470,098 | B2 | 10/2002 | Yamaguchi et al. |
| 6,639,603 | B1 | 10/2003 | Ishii |
| 6,757,447 | B2 | 6/2004 | Yamaguchi et al. |
| 6,760,035 | B2 | 7/2004 | Tjandrasuwita .............. 345/545 |
| 6,819,334 | B1 | 11/2004 | Owada et al. |
| 6,904,473 | B1 * | 6/2005 | Bloxham et al. ................ 710/22 |

(Continued)

OTHER PUBLICATIONS

U.S. Office Action dated Mar. 14, 2011 for U.S. Appl. No. 12/195,972.

(Continued)

Primary Examiner — M Good Johnson
(74) Attorney, Agent, or Firm — KED & Associates LLP

(57) ABSTRACT

A method for controlling display of an image includes generating a list of non-sequential random numbers, each number corresponding to a respective one of a plurality of lines in a source image. The lines in the source image are then transferred in non-sequential order from a first memory to a second memory based on the random numbers in the list and orientation change information. The resulting image in the second memory is then displayed in the desired orientation.

31 Claims, 20 Drawing Sheets

U.S. PATENT DOCUMENTS

| | | |
|---|---|---|
| 7,113,194 B2 | 9/2006 | Mamona et al. |
| 7,120,317 B1 | 10/2006 | Wu et al. |
| 7,259,772 B2 | 8/2007 | Koh |
| 7,411,620 B2 | 8/2008 | Taniguchi et al. |
| 7,411,630 B2 | 8/2008 | Kim et al. |
| 7,528,837 B2 | 5/2009 | Kitagawa |
| 7,587,524 B2 | 9/2009 | Cho et al. |
| 7,701,472 B2 * | 4/2010 | Obinata .................. 345/649 |
| 7,742,063 B2 | 6/2010 | Leung et al. |
| 7,751,652 B2 | 7/2010 | Tighe |
| 7,800,634 B2 | 9/2010 | Baek et al. |
| 2002/0057242 A1 | 5/2002 | Yoneda et al. ............... 345/87 |
| 2002/0091916 A1 | 7/2002 | Dowling |
| 2002/0101439 A1 | 8/2002 | Mamona et al. ............ 345/649 |
| 2002/0186229 A1 | 12/2002 | Brown Elliott ............ 345/649 |
| 2003/0016226 A1 | 1/2003 | Lu et al. ..................... 345/555 |
| 2003/0231195 A1 * | 12/2003 | Ueno et al. ................. 345/698 |
| 2004/0125103 A1 | 7/2004 | Kaufman et al. ........... 345/419 |
| 2004/0252135 A1 | 12/2004 | Ono ........................... 345/619 |
| 2005/0152197 A1 | 7/2005 | Cho et al. |
| 2006/0033760 A1 | 2/2006 | Koh ............................ 345/649 |
| 2006/0056738 A1 | 3/2006 | Keithley et al. ............ 382/307 |
| 2007/0005795 A1 | 1/2007 | Gonzalez |
| 2008/0285652 A1 | 11/2008 | Oxman et al. |

OTHER PUBLICATIONS

International Search Report and Written Opinion dated Jun. 1, 2009.
International PCT Search Report and Written Opinion dated Jun. 18, 2009.
PCT International Search Report dated Jul. 28, 2009.
U.S. Office Action dated May 12, 2011 for U.S. Appl. No. 12/195,873.
Notice of Allowance dated Nov. 2, 2011 for related U.S. Appl. No. 12/195,972.
U.S. Office Action dated Nov. 15, 2011 for U.S. Appl. No. 12/195,873.

* cited by examiner

SYSTEM AND METHOD FOR DISPLAYING A ROTATED IMAGE IN A DISPLAY DEVICE

This application claim priority to Provisional Application Nos. 60/969,825 filed Sep. 4, 2007, 61/012,832 filed Dec. 11, 2007 and 61/043,490 filed Apr. 9, 2008 whose entire disclosures are incorporated herein by reference.

FIELD

One or more embodiments described herein relate to the processing of images for presentation on a display device.

BACKGROUND

When viewing an image on a display device, it may be desirable to rotate or change the orientation of the image to obtain a more pleasing viewing experience or for a variety of other reasons. While systems have been developed to rotate an image on a display, these systems have significant drawbacks. For example, different code is used to perform different degrees of image rotation. This substantially increases the cost and complexity of the application software for driving the display. Also, many systems have prolonged processing times and other inefficiencies which make them undesirable, especially from the standpoint of the user.

BRIEF DESCRIPTION OF THE DRAWINGS

The advantages and features of the embodiments described herein will become better understood with reference to the following detailed description and claims taken in conjunction with the accompanying drawings, wherein like elements are identified with like symbols, and in which:

DETAILED DESCRIPTION

Figure 1:
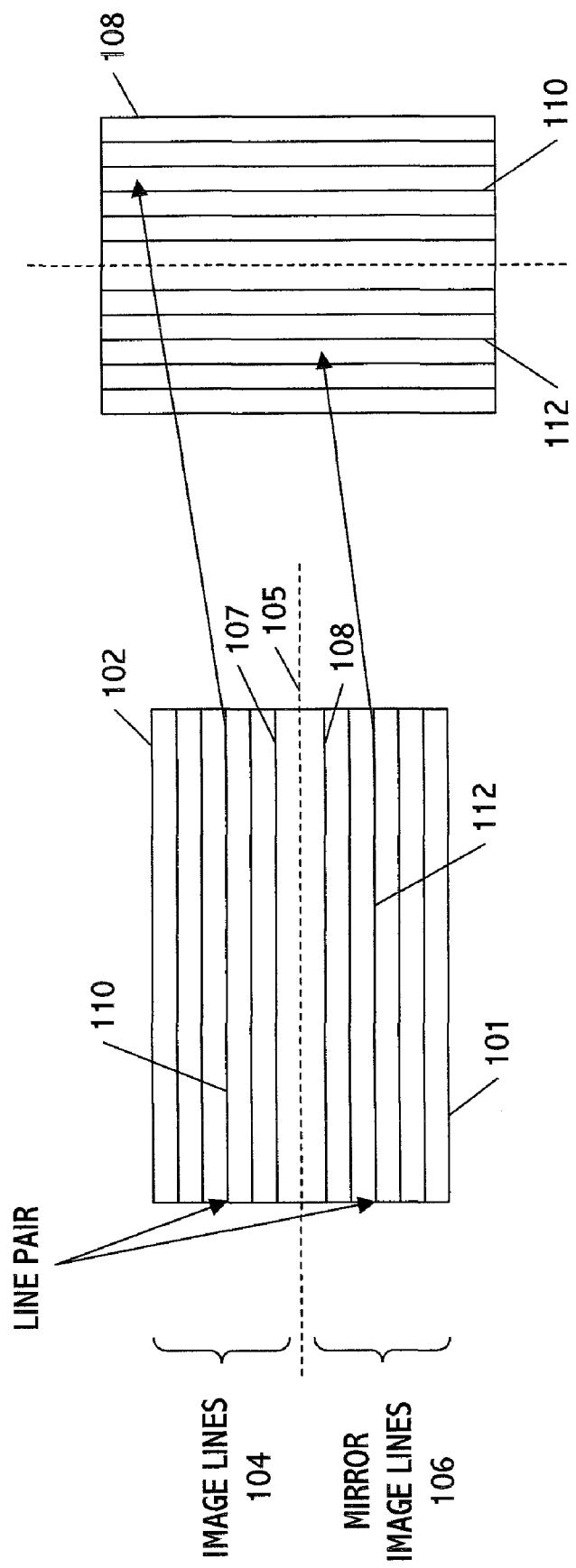
FIG. 1 is a diagram showing one way in which the orientation of a source image may be changed to produce a display image.

FIG. 1 is a diagram showing a source image 102 and a rotated image 108. The source image may include text, graphics, video, or other information capable of being viewed on a display device, which, for example, may be a television or monitor, the latter of which may be provided alone or within a processing device such as a notebook or desktop computer. More specific examples of the display device include but are not limited to a Liquid Crystal Display (LCD), Thin Film Transistor (TFT) LCD, a plasma display panel (PDP), and an electroluminescent display (organic or inorganic).

Under normal operating conditions, the source image is displayed in a predetermined orientation. However, under certain circumstances, it may be desirable to change the orientation of the source image. For example, the length of a document image may be greater than its width and the vertical dimension of the display device. As a result, only a portion of the document may be viewed on a screen at any given time. Because the horizontal dimension of most display devices is greater than its vertical dimension, changing the orientation of the source image, for example, by rotating it 90°, prior to display, will allow a person to view all or a greater portion of the information contained in image.

One or more embodiments described herein provide a method for changing the orientation of a source image. Referring to FIG. 1, this may be accomplished by translating the position of pixels in source image 102 to form rotated image 108. (The rotated image may be referred to as a display image since this is the image that is output for viewing on the display device.)

Figure 2:
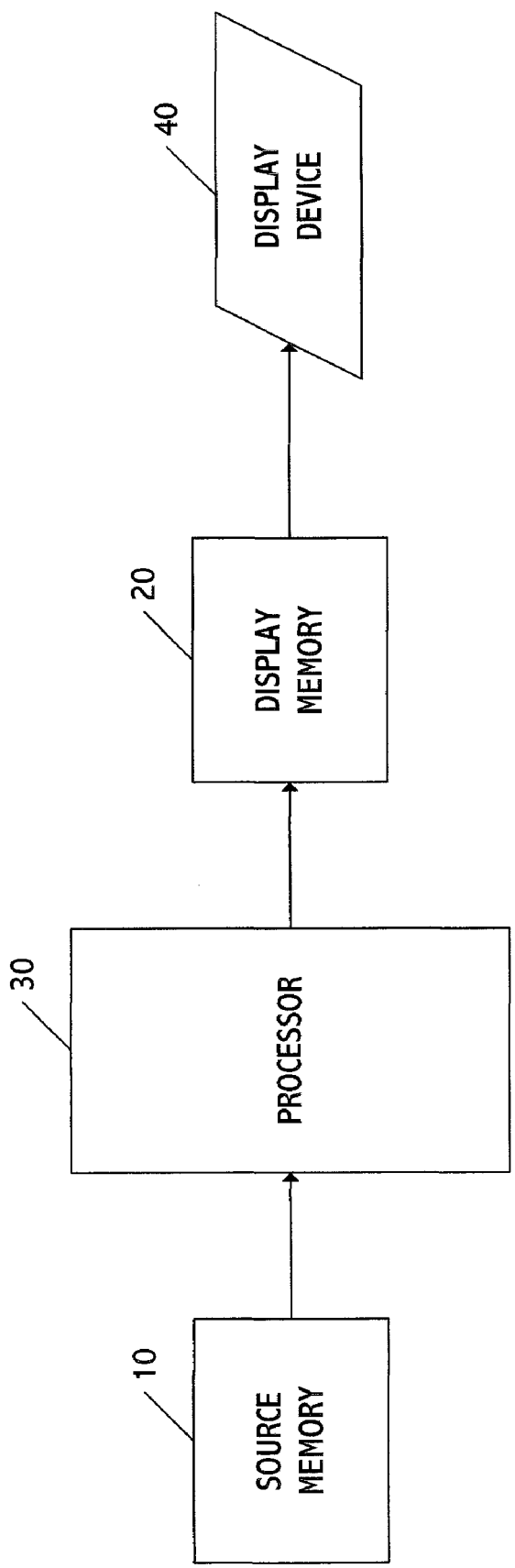
FIG. 2. is a diagram showing one example of a system for changing the orientation of a source image to produce a display image.

As shown in FIG. 2, the source image may be stored in a source memory 10 or other storage device. The orientation of the image may be changed by translating the pixels in the source image to different locations in a display memory 20. The source and display memories may correspond to different sections of a common memory unit or, for example, may be located on different integrated circuit chips. In order to perform the orientation change, a processor 30 may be included to control the translation of pixels from the source memory to the display memory. The image in the display memory is then output for viewing on display device 40.

Referring again to FIG. 1, the source image may have multiple lines that are divided into a first section 104 and a second section 106 by a reference point. (For illustrative purposes, the reference point is shown by dotted line 105). The reference point may coincide with one of the lines in the source image or may be located between two image lines. In accordance with one embodiment, the location of the reference point is set so that each section includes the same number of image lines. In other embodiments, the sections may include different numbers of lines.

For illustrative purposes, source image 102 is shown as including ten lines disposed within a border 101 and the reference point is between the fifth and sixth lines 107 and 108. Accordingly, the first and second sections each include five image lines. Dividing the source image in this manner produces five pairs of image lines, where each line in the first section has a mirrored counterpart in the second section. For example, line 110 in the first section corresponds to line 112 in the second section.

In order to generate the display image, the source image may be rotated at any desired angle including but not limited to 90°, 180°, 270°, or 360°. For example, rotation of the source image by an angle of 270° may produce display image 108. The image lines in the source image are translated in a random manner to form the display image. The manner in which the image lines are randomly translated from the source memory to the display memory is described in greater detail below.

Figure 3:
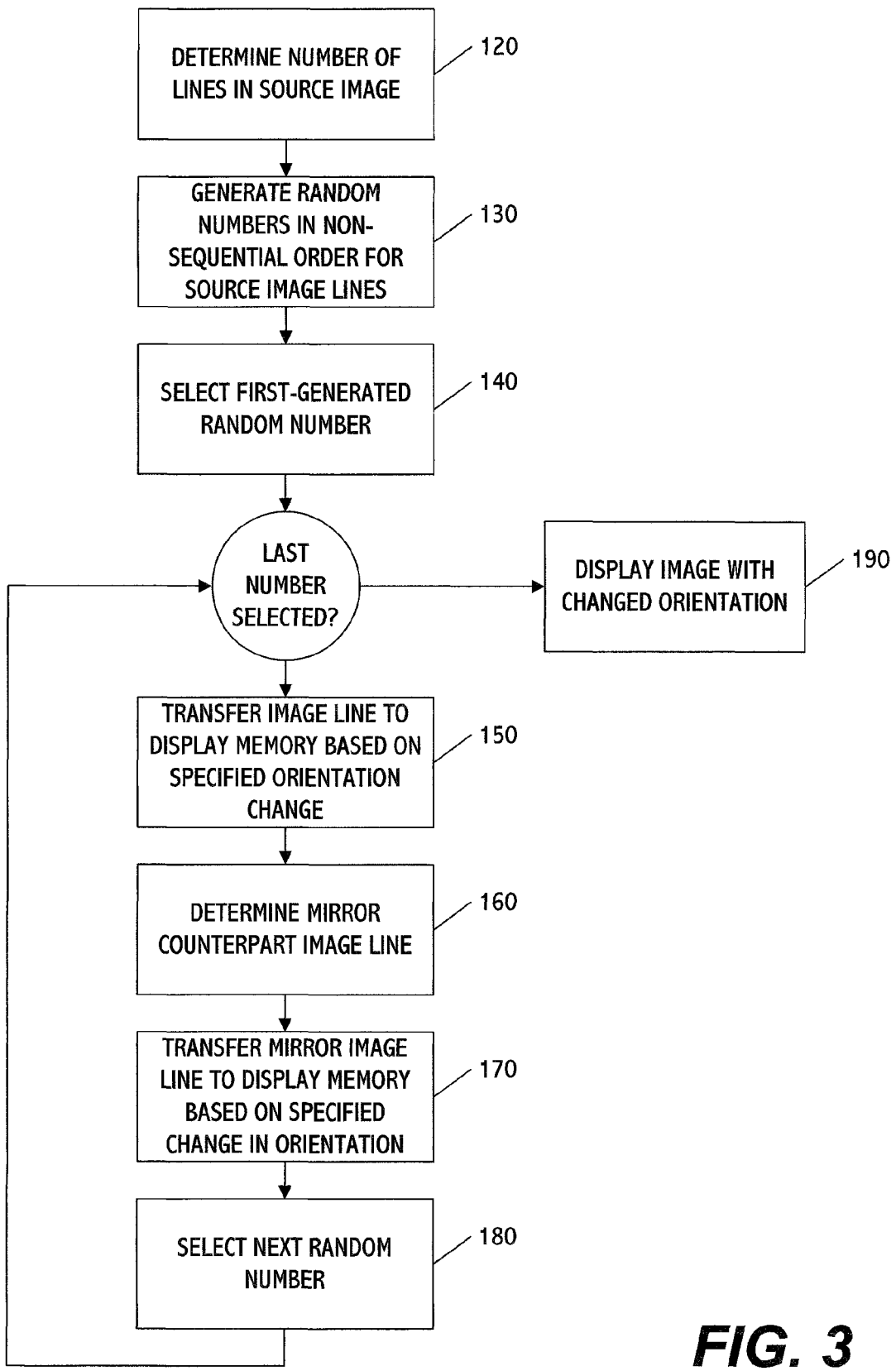
FIG. 3 is a flow diagram showing steps included in one embodiment of a method for changing the orientation of a source image to produce a display image.

Referring to FIG. 3, in accordance with one embodiment an initial step includes determining the number of lines in the source image. (Block 120). This determination may be made based on a predetermined or stored setting that indicates, for example, a maximum number of lines in the source image or a maximum number of lines allocated in the display device for displaying any given image.

A plurality of random numbers is then generated in non-sequential order equal in number to the number of lines in the source image. (Block 130). For example, the source image shown in FIG. 1 has ten image lines. Thus, ten numbers may be randomly generated in the following non-sequential order: 2 0 4 1 3 6 8 5 9 7. (In this example, the random numbers range from 0 to N−1, where N equals the total number of lines in the source image.)

Preferably, the non-sequential order is generated so that different pairs of adjacent random numbers in the list are separated by different incremental values. Thus, for example, adjacent random numbers 2 and 0 are separated by an incremental value of 2, adjacent random numbers 0 and 4 are separated by an incremental value of 4, and so on. These different incremental values may be used as a basis for controlling memory pointers of the source and display memories to effect a random, non-sequential transfer of image lines from the source memory to the display memory in accordance with the embodiments described herein. The random numbers in the list may be generated using known techniques.

Figure 4:
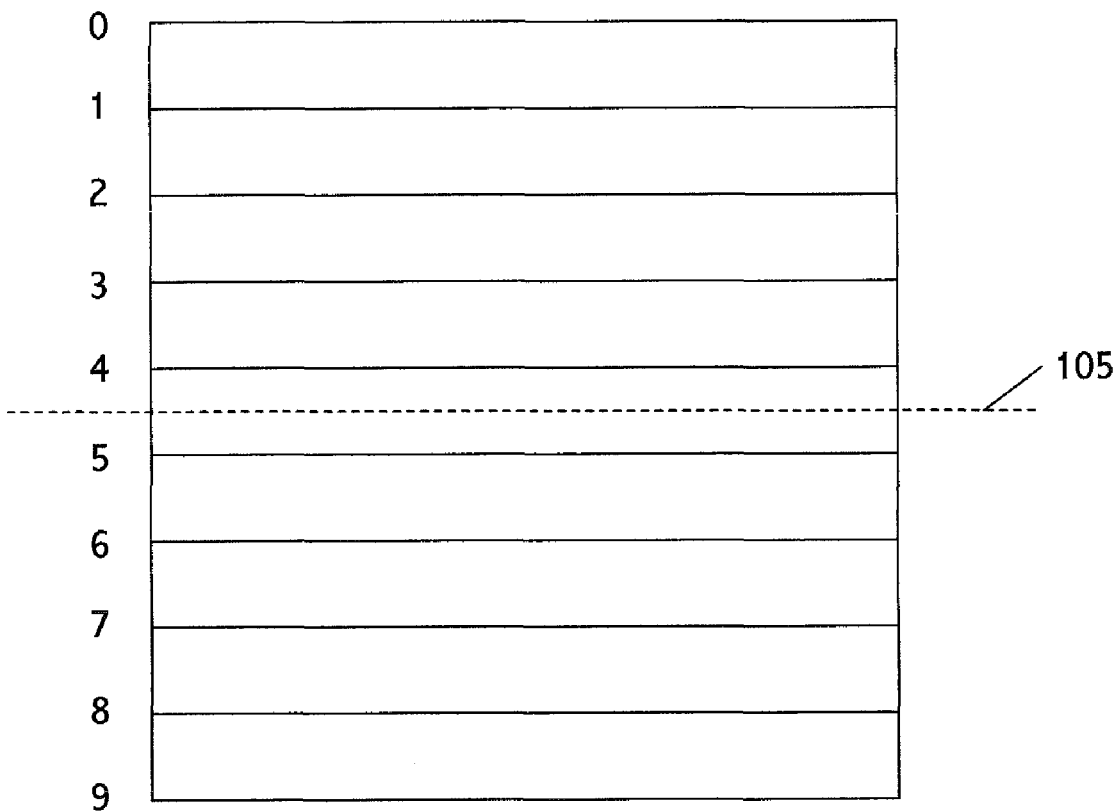
FIG. 4 is a diagram showing an arrangement of image lines in a source image whose orientation is to be changed.

Next, the first-generated random number is selected and set to correspond to an image line of the same number in the source image. (Block 140). As shown in FIG. 4, the image lines in the source image are preferably numbered from 0 to N−1 in sequential order.

After the image line corresponding to the first-generated random number is selected, this image line is transferred from the source memory to the display memory based on the change in orientation selected. (Block 150). For example, for a 270° rotation, the pixels in line 110 of the source image are transferred to memory locations in the display memory that correspond to the location of line 110 in display image 108.

After this transfer takes place, the mirror counterpart of the transferred line in the source image is determined. (Block 160). Thus, for example, as shown in FIGS. 1 and 4, if the first-generated random number is 2 (corresponding to image line 110), the mirror counterpart of the image line corresponding to random number 2 is line number 7 (corresponding to image line 112) relative to reference point 105.

Once this determination is made, the image line in the source memory that corresponds to the mirror counterpart (image line 112) is transferred from the source memory to the display memory based on the selected orientation. (Block 170). Thus, the pixels in line 112 of source image 102 are transferred to memory locations in the display memory that correspond to the location of line 112 shown in display image 108 in FIG. 1.

The next number in the list of random numbers is then selected. (Block 180). In the listed generated above, this number is 0. Steps analogous to those in Blocks 150, 160, 170 and 180 are then repeated until the remaining lines in the source memory are transferred into the display memory. (If at any time the next random number to be selected in the list corresponds to a mirror counterpart line that has already been transferred, that number may be skipped in favor of selecting one or more additional numbers from the list in sequential order, until a number is reached that corresponds to an image line in the source memory that has not yet been transferred.) Once all the lines have been transferred, the now-rotated image is displayed on the display device in accordance with the selected change in orientation. (Block 190).

Thus, the image lines in the source image are transferred from the source memory to the display memory in random non-sequential order. The image in the display memory is then shown on the display device in accordance with the locations of the image lines in the display memory. A one-to-one correspondence may exist between the pixel locations in the display memory and the pixel locations in the image displayed on the screen of the display device.

The transfer of pixels in each image line of the source image may be accomplished in various ways. For example, the pixels in each line may be transferred sequentially in accordance with the selected orientation. Alternatively, the pixels in each line may be transferred randomly, for example, in accordance with a random number list analogous to the one generated for transferring the source image lines. Other techniques for randomly or sequentially transferring the pixels in each image line may also be used.

In accordance with another embodiment, a plurality of random numbers is generated in non-sequential order. However, unlike the embodiment in FIG. 3, the number of random numbers is equal to only a portion (e.g., half) of the number of lines in the source image. Thus, for example, for the source image shown in FIG. 1, five numbers may be randomly generated in the following non-sequential order: 2 0 4 1 3. Images lines in the source image, and their mirror image lines, are then selected for transfer based on this order.

Figure 5:
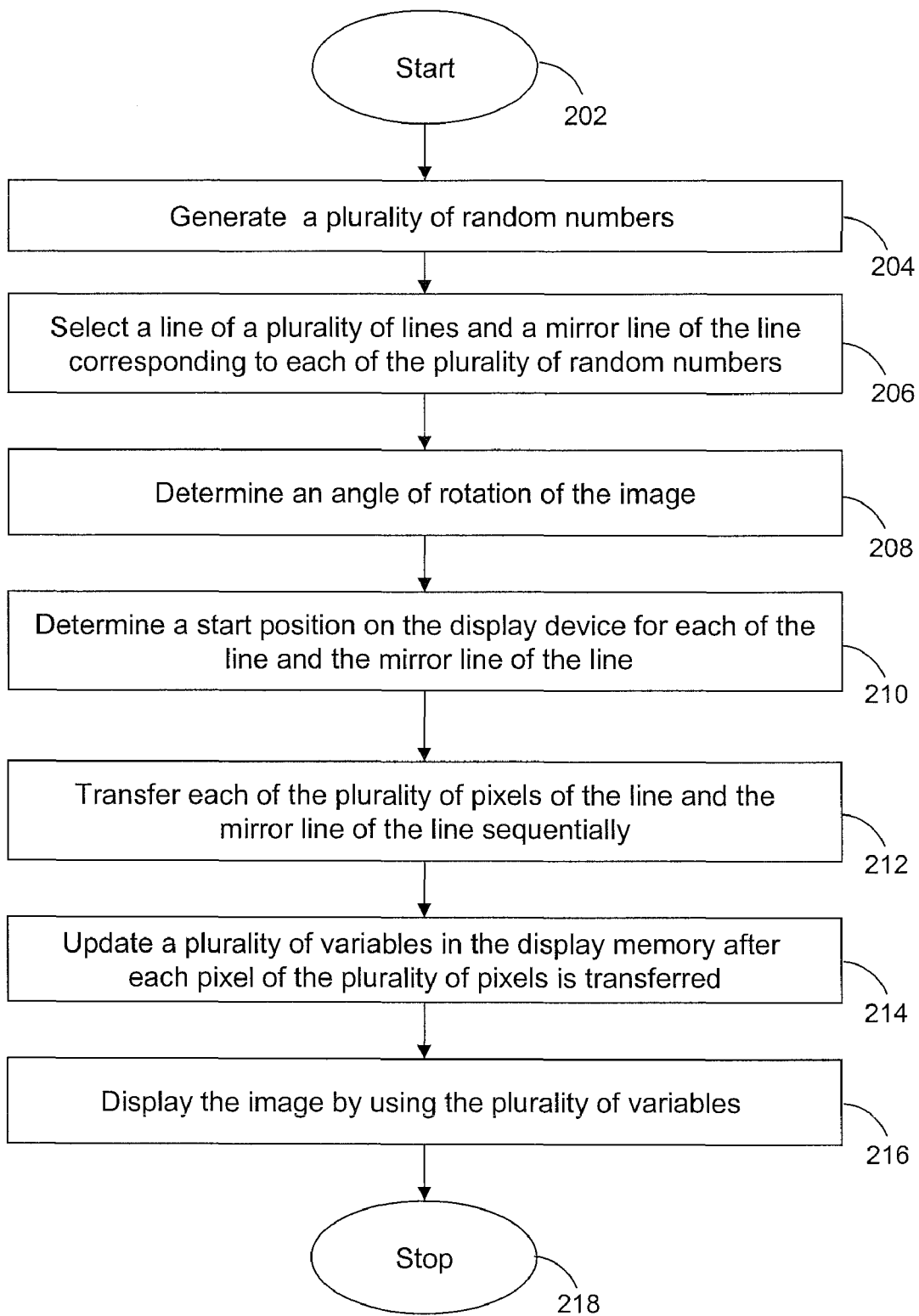
FIG. 5 is a flow diagram showing steps included in one embodiment of a method for displaying an image in a display device.
Figure 9:
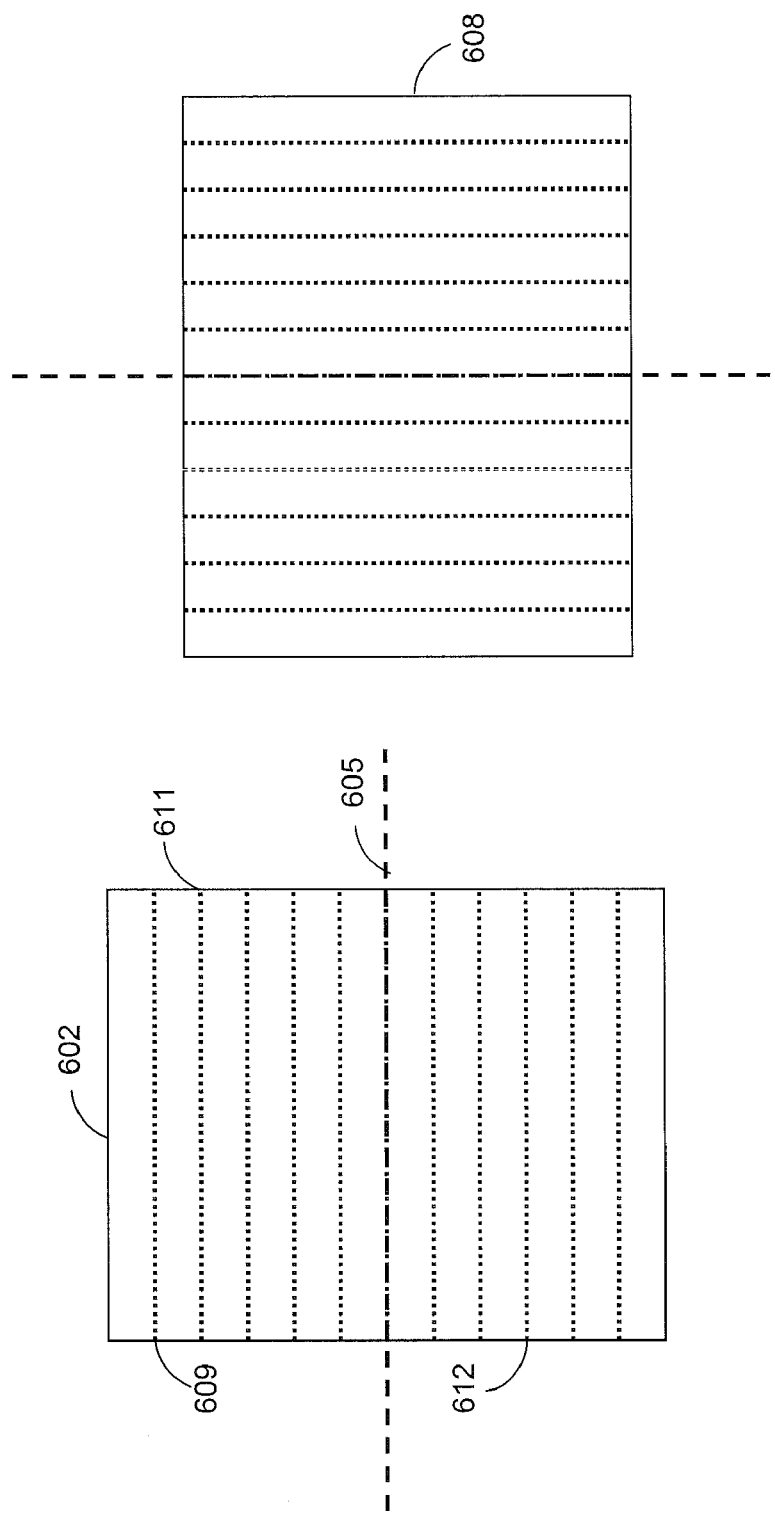
FIG. 9 shows another way in which the orientation of a source image may be changed to produce a display image.

FIG. 5 shows steps for changing the orientation of a source image for display on a display device in accordance with another embodiment. The method is initiated at step 202. At step 204, a plurality of random numbers is generated and each of the plurality of random numbers corresponds to a respective one of the lines in source image 602 shown in FIG. 9.

According to this exemplary embodiment, the source image comprises thirteen lines and therefore thirteen random numbers are generated. Each of the thirteen random numbers corresponds to a respective one of the thirteen lines in source image 602. Each of the plurality of lines will be assigned a number. The random numbers are preferably generated from 0 to N−1. Accordingly, line 609 in FIG. 9 corresponds to number 2, line 611 corresponds to number 3, and so on.

At step 206, a line corresponding to one of the random numbers and its mirror line are selected. The mirror line may be determined relative to reference point 605. For example, if number 3 is generated as a first random number of the plurality of random numbers, then line 611 and mirror line 612 are selected.

At step 208, the angle of rotation of the image is determined. This angle corresponds to the orientation of the image selected or otherwise designated for display in the display device. This angle may be based on information input by a user (e.g., a user selection or setting) or may be automatically determined, for example, as a result of a user rotating the screen of the display device. In this latter case, the display device may have a rotatable screen and a detector may be used to detect a rotated position of the screen as the angle of rotation. Once detected, the source image may be translated in accordance with the embodiments described herein and then output to the physically rotated display screen.

At step 210, a start position of each of the plurality of lines selected is determined. This start position may correspond to and control a pointer in the source memory. The start position in the display device and thus the pointer of the display memory may be determined using the angle of rotation. For example, if the source image is to be rotated by 270°, the start position of the display image (which is the source image rotated at the angle of 270°) will be determined according to a plurality of variables, which, for example, may be the ones described for the embodiments in FIGS. 7A-7C and FIG. 8A-8C discussed in greater detail below.

At step 212, each of the pixels in line of the source image is transferred from the source memory to the display memory. For example, if the random number 3 is selected, the pixels in line 610 are transferred to locations in the display memory that correspond to the designated angle of rotation. In accordance with one implementation, the pixels in each line of the source image are transferred to the display memory sequentially on a per image-line basis.

Next, the pixels in line 612 are transferred to the display memory. To perform the transfer of pixels and lines from the source memory to the display memory, at step 214, one or more variables may be updated. For example, a screen pointer variable may be updated each time a pixel is transferred from the source memory to the display memory. A corresponding update may be performed for a source memory pointer. At step 216, the resulting rotated image is displayed based on the plurality of variables that were updated. The method terminates at step 218.

Figure 6:
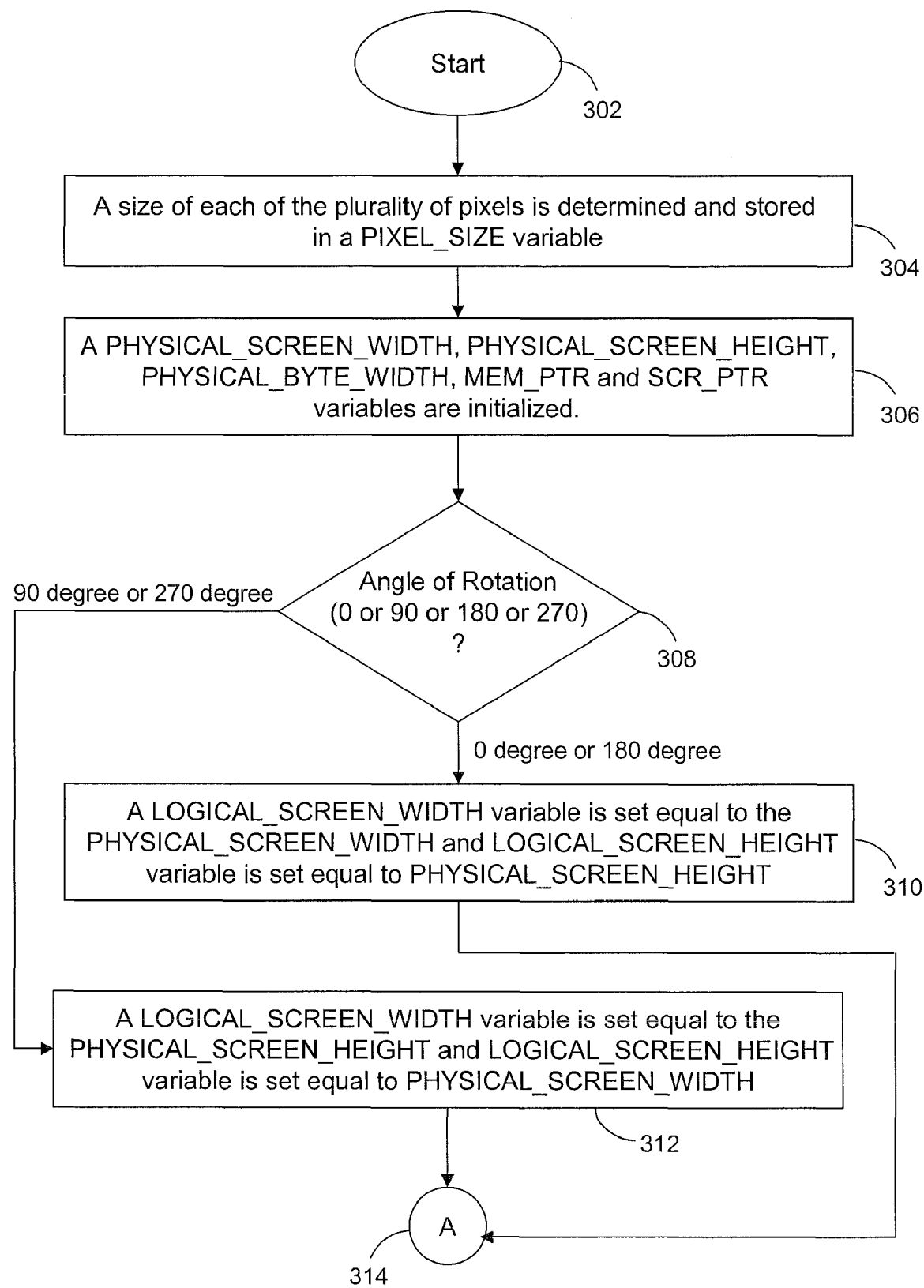
FIG. 6 is a flow diagram showing one way in which a plurality of variables may be initialized for rotating a source image.

FIG. 6 is a flow diagram showing steps that may included in one embodiment for initializing variables to be used in rotating the source image. The variables to be initialized include a PIXEL_SIZE, a PHYSICAL_SCREEN_WIDTH, a PHYSICAL_SCREEN_HEIGHT, a PHYSICAL_BYTE_WIDTH, a MEM_PTR, a SCR_PTR, a LOGICAL_SCREEN_WIDTH and a LOGICAL_SCREEN_HEIGHT.

The method initiates at step 302, when a request for displaying the image 102 on the display screen is received by a driver program code. The request for displaying the image 102 on the display screen can be sent by an application program, an operating system, or a user defined program interface. The request for displaying the image 102 in rotated format is processed by the driver program code.

At step 304, a size of each of the plurality of pixels of each of the plurality of lines of the source image may be determined and the size of each of the plurality of pixels is stored in the PIXEL_SIZE variable. A pixel is a single point in the source image. The image is divided into a plurality of pixels arranged in rows (or the plurality of lines) and columns.

The number of bits used to represent each pixel may be used as a basis for determining how many colors or shades of gray can be displayed. For example, in 8-bit color mode, 8 bits are assigned for each pixel, thereby making it possible to display $2^8=256$ different colors or shades of gray of the source image.

The size of each pixel can be selected by a user of the display screen, the application program, or the operation system. For example, the size of each pixel can be set to 1 byte per pixel (Palette Mode), 2 bytes per pixel (High color Mode), 3 bytes per pixel (True color Packaged Mode), or 4 bytes per pixel (True color aligned Mode). At step 306, the PHYSI-CAL_SCREEN_WIDTH variable is set equal to width in pixels of the source image in the source memory. For example, if each line comprises 10 pixels, then the PHYSI-CAL_SCREEN_WIDTH variable is set to 10.

Further, at step 306, the PHYSICAL_SCREEN_HEIGHT variable is set equal to a height in pixels of the source image in the source memory. For example, if each column of the source image comprises 10 pixels, the PHYSI-CAL_SCREEN_HEIGHT variable is set to 10. Furthermore, the PHYSICAL_BYTE_WIDTH variable is set equal to a product of the PHYSICAL_SCREEN_WIDTH variable and the PIXEL_SIZE variable, for example if the PIXEL_SIZE variable is set equal to 1 byte and the PHYSICAL_SCREEN_WIDTH variable is set to 10, the PHYSICAL_BYTE_WIDTH variable will be equal to 10 bytes. Also, at step 306, the MEM_PTR variable is set equal to a base address to a bitmap in the source memory and the SCR_PTR variable (the screen pointer variable) is set equal to a base address of the display memory.

At step 308, it is determined whether the angle of rotation of the source image is equal to 0° or 180°. If the angle of rotation of the source image is 0° to 180°, then, at step 310, the LOGICAL_SCREEN_WIDTH variable is set equal to the PHYSICAL_SCREEN_WIDTH variable and the LOGI-CAL_SCREEN_HEIGHT variable is set equal to the PHYSI-CAL_SCREEN_HEIGHT variable. Control proceeds to step 314 after step 310.

At step 308, if the angle of rotation of the source image is not 0° or 180°, then, at step 312, the LOGICAL_SCREEN_WIDTH variable is set equal to the PHYSCIAL_SCREEN_HEIGHT variable and the LOGICAL_SCREEN_HEIGHT variable is set equal to the PHYSICAL_SCREEN_WIDTH variable. Control goes to 314 after the step 312.

At 314, a determination is made as to whether the angle of the rotation of the source image is 0°, 90°, 180°, or 270°. If the angle of the rotation is 0° or 180°, control goes to a step 402, in a flow diagram which will be described in conjunction with FIGS. 7A-7C. If the angle of the rotation of the image is 90° or 270°, then control goes to a step 502 described in FIG. 5, in a flow diagram which will be described in conjunction with FIGS. 8A-8C.

Figure 7A:
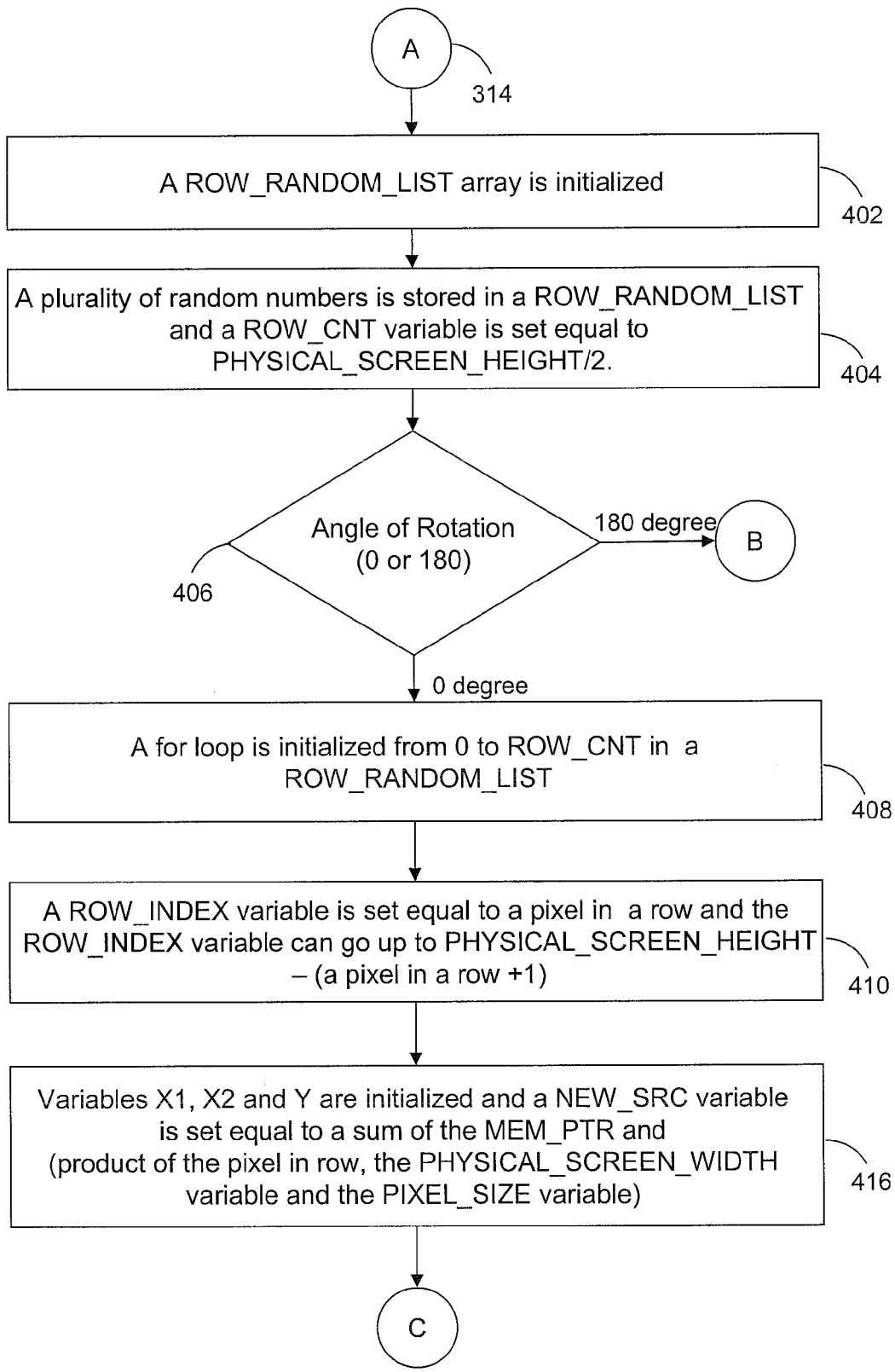
FIGS. 7A-7C are flow diagrams showing steps included in an algorithm for rotating the source image at an angle of 0° or 180°.
Figure 7B:
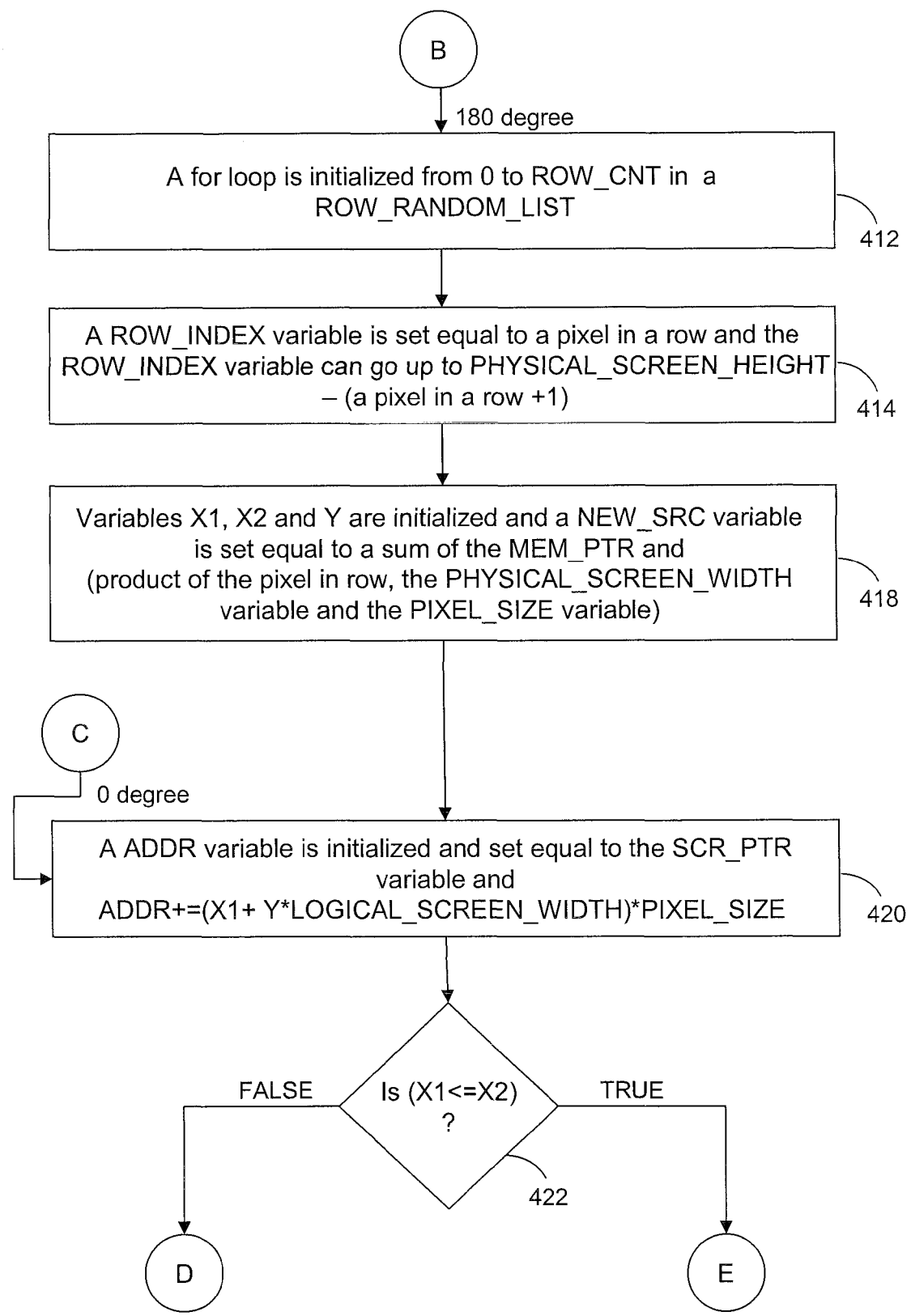
Figure 7C:
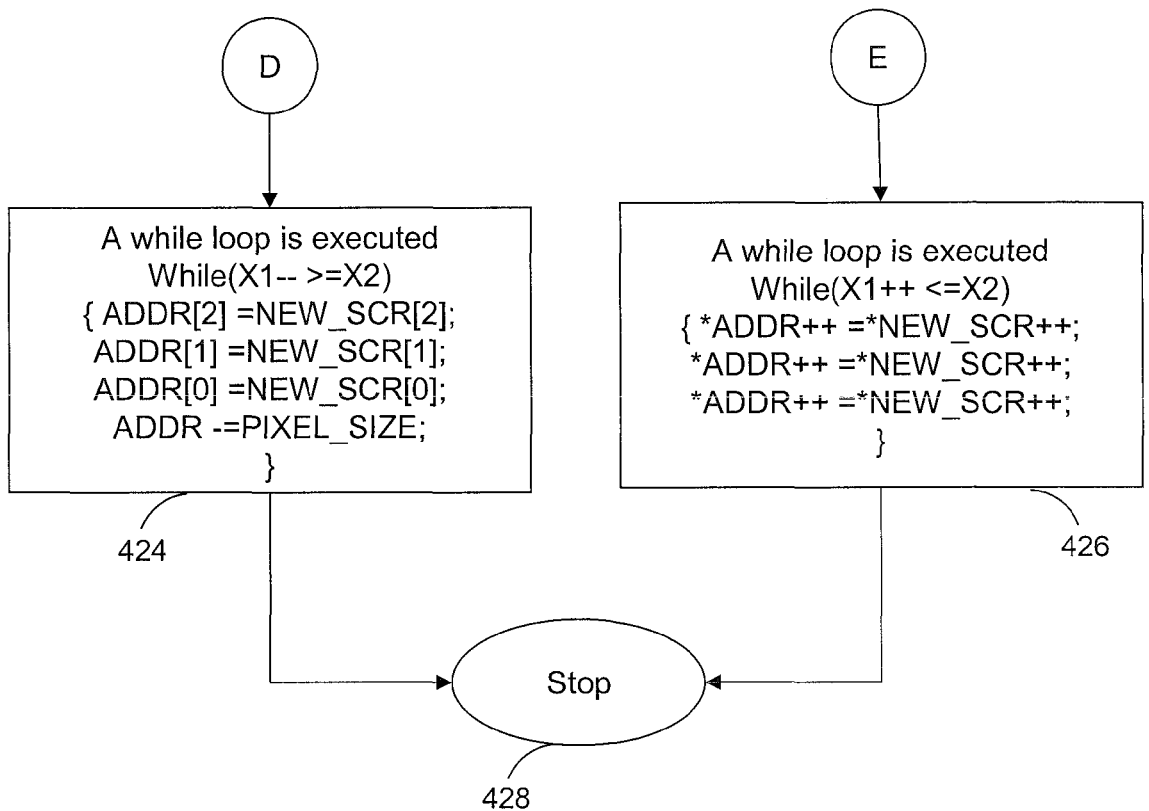

FIGS. 7A-7C are flow diagrams showing steps included in an algorithm for rotating source image 602 at an angle of 0° or 180°. If the rotation angle is 0° or 180°, control goes to step 402. At step 402, a ROW_RANDOM_LIST array is initialized. This array includes integers from 0 to (PHYSI-CAL_SCREEN_HEIGHT-1). For example, if the PHYSI-CAL_SCREEN_BEIGHT variable is equal to 10, the ROW_RANDOM_LIST array will comprise numbers from 0 to 9.

At step 404, a plurality of random numbers is generated equal in number to the plurality of lines (rows) in the source image. A count of the plurality of random numbers is equal to the PHYSCIAL_SCREEN_HEIGHT. Also, at step 404, a ROW_CNT variable is initialized. The ROW_CNT variable is set equal to (PHYSICAL_SCREEN_HEIGHT)/2.

At step 406, it is determined whether the angle of rotation of the figure is 0° or 180°. If the angle of rotation is 0°, control goes to step 408. Otherwise, control goes to step 412.

If, the angle of rotation is 0°, then, at step 408, a FOR loop is initialized from 0 to the ROW_CNT variable, and at step 410 a ROW_INDEX variable is initialized and set equal to a pixel in a row. The ROW_INDEX variable can go up to PHYSICAL_SCREEN_HEIGHT-(a pixel in a row+1). Step 410 may be used for traversing through each of the plurality of pixels of each of the plurality of lines of the source image. Control then goes to a step 416 for initializing variables X1, X2, and Y. Coordinates (X1, Y) indicate a start position of a line of the plurality of lines of the source image, when the source image is rotated at the angle of 0°.

Coordinates (X2, Y) indicate an end position of the line of the plurality of lines of the source image, when the image is rotated at the angle of 0°. X1 is set equal to 0, X2 is set equal to PHYSICAL_SCREEN_WIDTH−1, Y is set equal to the pixel in row. In addition, a NEW_SRC variable is initialized and set equal to a sum of memory pointer MEM_PTR and (product of the pixel in row, the PHYSICAL_SCREEN_WIDTH variable and the PIXEL_SIZE variable).

If, at step 406, the angle of rotation of the source image is determined to be 180°, then, at step 412, a FOR loop is initialized from 0 to ROW_CNT variable. At step 414, the ROW_INDEX variable is initialized and set equal to a pixel in a row. The ROW_INDEX variable can go up to PHYSICAL_SCREEN_HEIGHT−(a pixel in a row+1). Step 414 may be used for traversing through each of the plurality of pixels of each of the plurality of lines of the source image. Control then goes to a step 418 for initializing variables X1, X2, and Y. Coordinates (X1, Y) indicate a start position of a line of the plurality of lines of the source image 102, when the source image is to be rotated by 180°.

The coordinates (X2, Y) indicates an end position of the line of the plurality of lines of the source image, when the image is rotated at the angle of 180°. X1 is set equal to PHYSICAL_SCREEN_WIDTH−1, X2 is set equal to 0, Y is set equal to the PHYSICAL_SCREEN_HEIGHT−the pixel in row−1. Further, a NEW_SRC variable is initialized and set equal to a sum of the MEM_PTR and (product of the pixel in row, the PHYSICAL_SCREEN_WIDTH variable and the PIXEL_SIZE variable). The step 418 is performed for rotating the source image at the angle of 180°.

After steps 416 and 418, control goes to step 420 where an ADDR variable is initialized and set equal to the SCR_PTR variable. The ADDR variable is set equal to the sum of a previous value in the ADDR variable and a product of the PIXEL_SIZE variable and (sum of X1, product of Y and LOGICAL_SCREEN_WIDTH variable). Thereafter, at step 422, it is determined whether X1≦X2, and if the X1 is less than or equal to X2, then the control goes to step 426.

If the X1 is less than X2, this indicates that each of the plurality of pixels are not transferred for a particular line of a plurality of lines to the display memory, therefore at step 426, a while loop is executed. While X1++ is less than or equal to X2, then the value of *ADDR (value stored at the ADDR variable) is incremented by 1 and the value *NEW_SRC (value stored at the NEW_SCR variable) is incremented by 1. The said operation is repeated three times.

When the control flows out of while loop in the step 426, control goes to the step 428 and the method is terminated. If, at step 422, it is determined that X1>X2, control goes to step 424. At step 424 a while loop is executed. While X1 is greater than or equal to X2, the value of X1 is decremented, when the said condition is true, then the value stored at the ADDR+2 variable is assigned a value stored at a the NEW_SCR+2 variable. Further the value stored at the ADDR+1 variable is assigned a value stored at the NEW_SCR+1 variable, the value stored at the ADDR variable is assigned a value stored at the NEW_SCR variable.

Furthermore, the variable ADDR is set equal to a difference of a previous memory location pointed by the ADDR variable and the PIXEL_SIZE variable. When, the control flows out of the while loop in step 424, then the method is terminated at step 428. The step 420, 422, 424 and 426 are used for transferring each of the plurality of lines (rows) of the image to the display memory. Each of the plurality of lines is transferred by transferring each of the plurality of pixels of each of the plurality of lines. For example, if the line 109 is to be transferred to the display memory, and each of the plurality of lines comprises 10 pixels, then the ADDR variable will be incremented 10 times, since the X2 variable will be set equal to PHYSICAL_SCREEN_WIDTH−1, the PHYSICAL_SCREEN_WIDTH variable is set equal to the width in pixels of the image, the width in pixels of the image is equal to number of pixels in each of the plurality of lines. Once each of the plurality of lines is transferred to the display device, then the image rotated at a particular angle is displayed at the display device, using the plurality of variables described above.

Figure 8A:
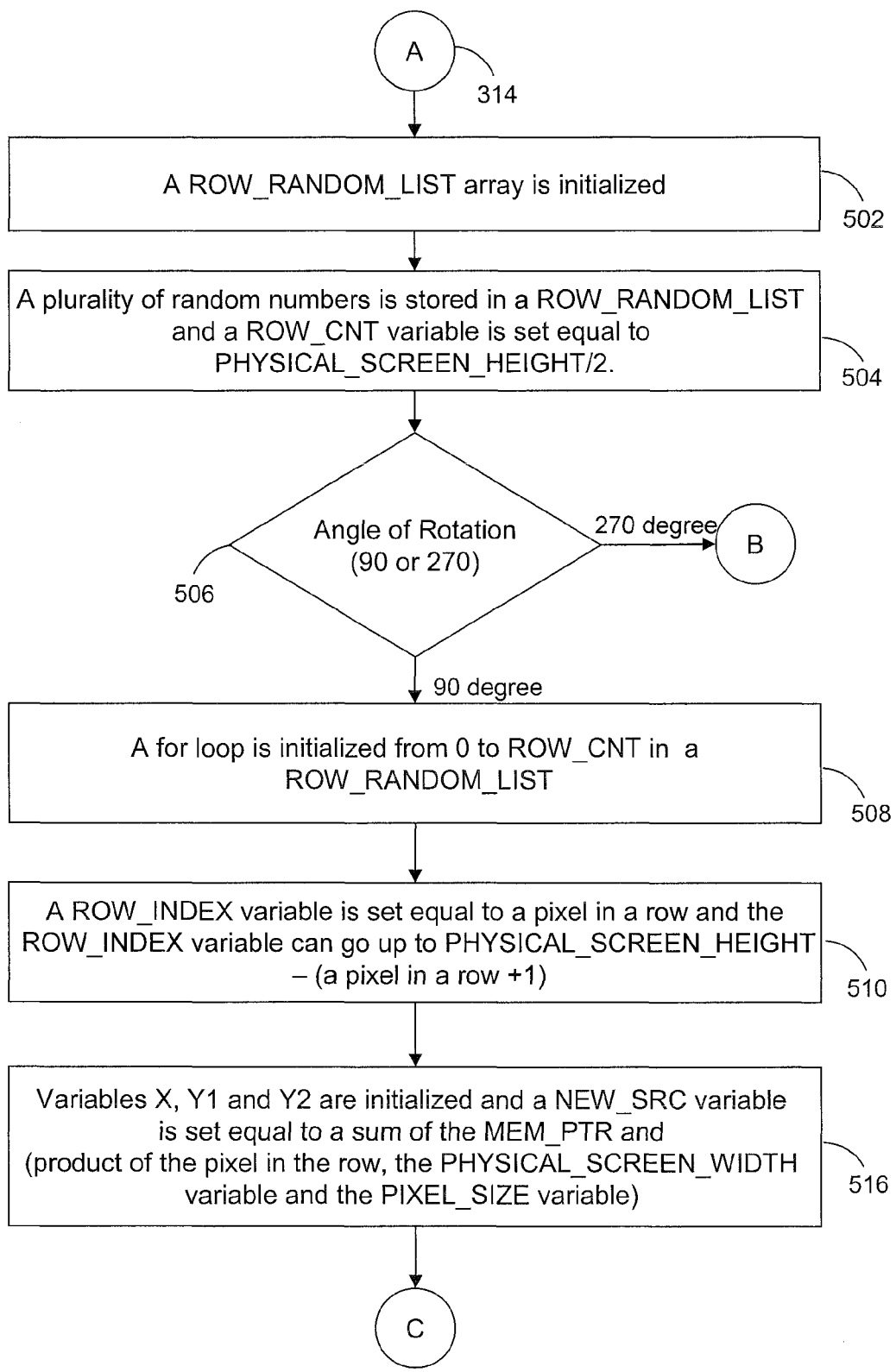
FIG. 8A-8C are flow diagrams showing steps included for rotating the source image at an angle of 90° or 270°.
Figure 8B:
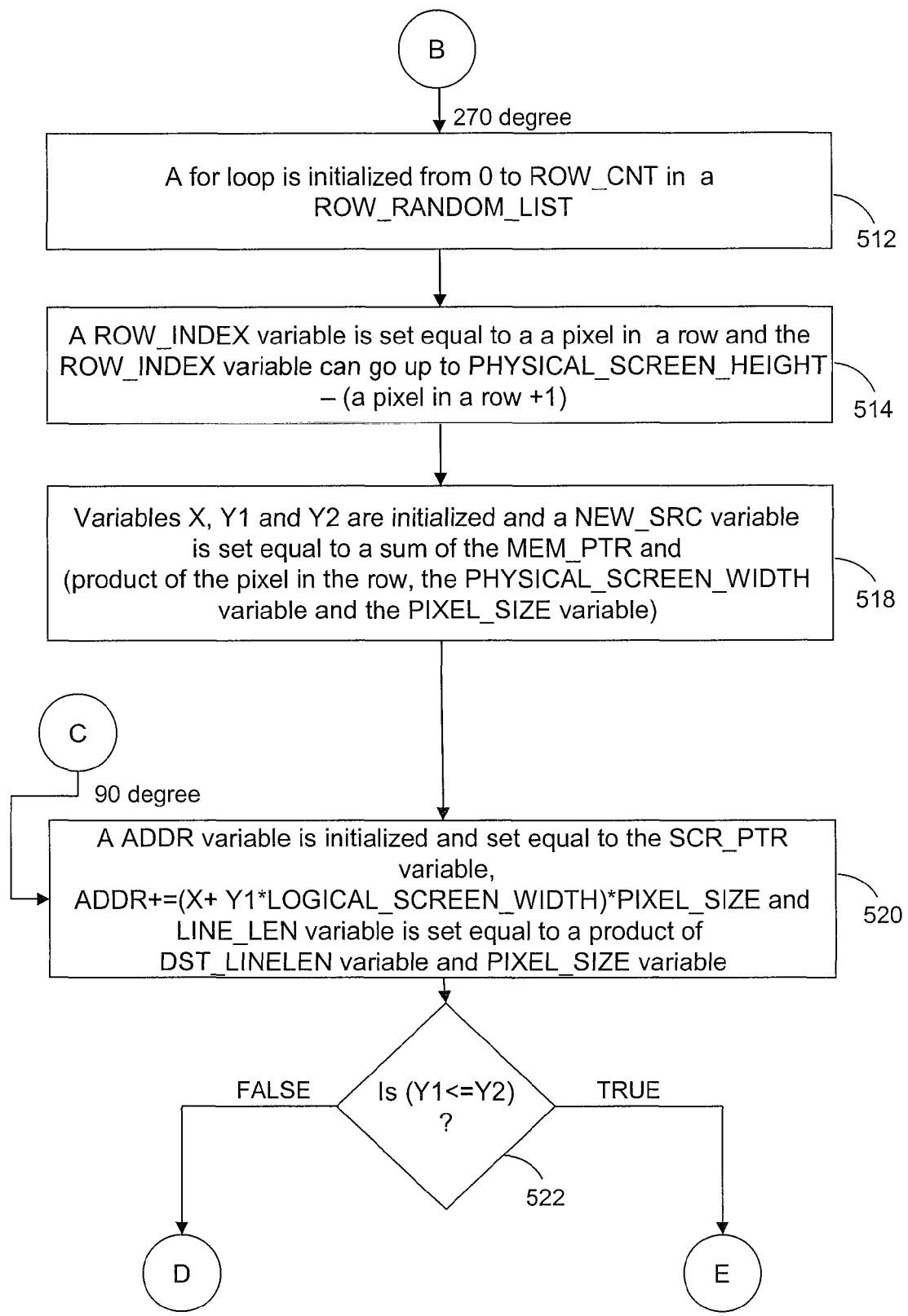
Figure 8C:
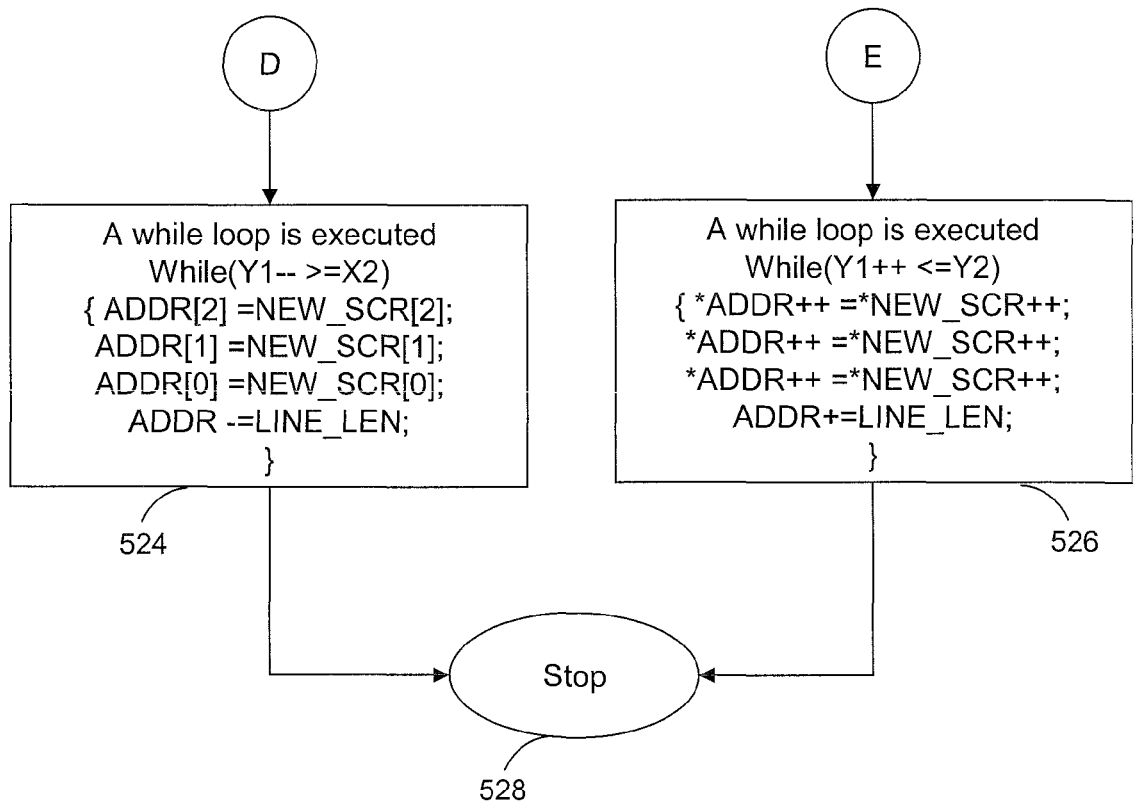

FIG. 8A-8C are flow diagrams showing steps included in an algorithm for rotating a source image at an angle of 90° or 270°. If the angle of rotation of the source image is 90° or 270°, control goes to step 502. At step 502, the ROW_RANDOM_LIST array is initialized and comprises integers from 0 to (PHYSICAL_SCREEN_HEIGHT−1). For example, if the PHYSICAL_SCREEN_HEIGHT variable is equal to 10, then the ROW_RANDOM_LIST array will comprise numbers from 0 to 9. At step 504, the plurality of random numbers is generated and the plurality of random numbers generated is equal to the plurality of lines (rows) in the source image.

Count of a plurality of random numbers is equal to the PHYSICAL_SCREEN_HEIGHT. Further, at step 504, a ROW_CNT variable is initialized. The ROW_CNT variable is set equal to (PHYSICAL_SCREEN_HEIGHT)/2. At step 506, it is determined whether the angle of rotation is 90° or 270°. If the angle of rotation is 90°, control goes to step 508. Otherwise, control goes to step 510.

If the angle of rotation is 90°, then at step 508, a FOR loop is initialized from 0 to the ROW_CNT variable and, at step 410, a ROW_INDEX variable is initialized and set equal to a pixel in a row. The ROW_INDEX variable can go up to PHYSICAL_SCREEN_HEIGHT−(a pixel in a row+1). The step 510 is used for traversing through each of the plurality of pixels of each of the plurality of lines of the source image. The control goes to a step 516, at step 516, a variable X, Y1, Y2 are initialized. The coordinates (X, Y1) indicates a start position of a line of the plurality of lines of the source image 102, when the source image is rotated at the angle of 90°.

The coordinates (X, Y2) indicates an end position of the line of the plurality of lines of the source image, when the image is rotated at the angle of 90°. X is set equal to the pixel in a row. Y1 is set equal to PHYSICAL_SCREEN_WIDTH−1, Y2 is set equal to 0. Further, the NEW_SRC variable is initialized and set equal to a sum of the MEM_PTR and (product of the pixel in row, the PHYSICAL_SCREEN_WIDTH variable and the PIXEL_SIZE variable).

If, at step 506, it is determined that the angle of rotation of the source image is 270°, then, at step 512, a FOR loop is initialized from 0 to ROW_CNT variable. At step 514, the ROW_INDEX variable is initialized and set equal to a pixel in a row. The ROW_INDEX variable can go up to PHYSICAL_SCREEN_HEIGHT−(a pixel in a row+1). The step 514 is used for traversing through each of the plurality of pixels of each of the plurality of lines of the image 102. The control goes to a step 518, at step 518, a variable X, Y1, Y2 are initialized. The coordinates (X1, Y) indicates a start position of a line of the plurality of lines of the source image, when the source image is rotated at the angle of 270°.

The coordinates (X, Y2) indicates an end position of the line of the plurality of lines of the source image, when the image is rotated at the angle of 270°. X is set equal to PHYSICAL_SCREEN_HEIGHT−the pixel in a row−1, Y1 is set equal to 0, and Y2 is set equal to the PHYSICAL_SCREEN−

WIDTH−1. Further, the NEW_SRC variable is initialized and set equal to a sum of the MEM_PTR and (product of the pixel in row, the PHYSICAL_SCREEN_WIDTH variable and the PIXEL_SIZE variable). The step 518 is performed for rotating the source image at the angle of 270°. When rotated at the angle of 270°, the source image is oriented as shown with reference to display image 608.

After steps 516 and 518, control goes to step 520 and the ADDR variable is initialized and set equal to the SCR_PTR variable. The ADDR variable will be set equal to the sum of a previous value in the ADDR variable and a product of PIXEL_SIZE and (sum of X, product of Y1 and the LOGICAL_SCREEN_WIDTH variable). Further, a LINE_LEN variable is initialized and set equal to a product of DST_LINELEN variable and the PIXEL_SIZE variable.

Thereafter, at step 522, it is determined whether Y1<=X2, and if the Y1 is less than equal to Y2, then the control goes to step 526. If Y1 is less than Y2, this indicates that each of the plurality of pixels are not transferred for a particular line of a plurality of lines to the display memory, therefore at step 526, a while loop is executed. While Y1++ is less than or equal to Y2, then the value of *ADDR (value stored at the ADDR variable) is incremented by 1 and the value *NEW_SRC (value stored at the NEW_SCR variable) is incremented by 1. The said operation is repeated thrice. Furthermore, the ADDR variable is set equal to a sum of a previous memory location pointed by the ADDR variable and the LINE_LEN variable.

When the control flows out of while loop in step 526, then control goes to step 528 and the method is terminated. If, at step 522, it is determined that Y1>Y2, then control goes to step 524. At step 524 a WHILE loop is executed. While Y1 is greater than or equal to Y2, the value of Y1 is decremented, when the said condition is true, then the value stored at the ADDR+2 variable is assigned a value stored at a the NEW_SCR+2 variable. Further the value stored at the ADDR+1 variable is assigned a value stored at the NEW_SCR+1 variable, the value stored at the ADDR variable is assigned a value stored at the NEW_SCR variable.

Furthermore, the variable ADDR is set equal to a difference of a previous memory location pointed by the ADDR variable and the LINE_LEN variable When, the control flows out of the while loop in step 524, and then the method is terminated at step 528. Steps 520, 522, 524 and 526 are used for transferring each of the plurality of lines (rows) of the image to the display memory.

Each of the plurality of lines is transferred by transferring each of the plurality of pixels of each of the plurality of lines. Once each of the plurality of lines is transferred to the display device, then the image rotated at a particular angle is displayed at the display device, using the plurality of variables described above.

In accordance with one or more embodiments described herein, a method is provided for transferring a source image from a source memory to a display memory of a display device in accordance with a selected or designated change in orientation. The method may be implemented in a way that does not use predefined increment values for performing transferring image lines from the source to the display memory. Rather, the source image is transferred to the display memory in a random order based on a random number list that guides the image-line transfer.

The random order is designated using a random number list. By using this list to control random image-line transfer, driver program code is substantially reduced which leads to a corresponding reduction in the time and complexity of implementing the driver program code. Further, the driver program code may change the orientation of the image in a plurality of modes, wherein different program code does not have to be used to implemented the orientation change in each mode. This advantageously leads to decreased usage of memory space in the display memory.

In the event that a reference point coincides with one of the lines in the source image (that is, if reference point 605 in FIG. 9 coincides with a middle one of the reference lines), then this image line may be the last image line transferred from the source memory to the display memory. This may be accomplished, for example, by determining the identity of the image line corresponding to the reference point and then skipping the random number corresponding to this image line. The image line in the source image corresponding to this skipped number may then be the last line transferred into the display memory.

Also, in accordance with one or more of the foregoing embodiments, all pixels in each line are preferably transferred before pixels in any subsequent line are transferred to the display memory. Moreover, as previously discussed, the lines in the source image may be transferred to the display memory by controlling pointers of source and display memories. One or both of these pointers may be controlled based on different incremental values, which are used to control movement of the pointers when transferring different lines of the source image from the source memory to the display memory.

The embodiments described herein may implemented in the form of computer-implemented processes or software product. Such a product may include computer program code containing instructions embodied in, for example, one or more floppy disks, CD-ROMs, hard drives, flash memories, network downloads, or any other computer-readable storage medium or computerized means of conveyance.

According to one embodiment, computer program code, for example, stored in a storage medium, loaded into, and/or executed by a computer, or transmitted over some transmission medium, such as over electrical wiring or cabling, through fiber optics, or via electromagnetic radiation may be used. The computer program code may be loaded into and executed by a computer, the computer becomes an apparatus for practicing the embodiments described herein. When implemented on a general-purpose microprocessor, the computer program code segments configure the microprocessor to create specific logic circuits.

While the change of orientation in accordance with the foregoing embodiments has been described as corresponding to an angular rotation of the source image, those skilled in the art can appreciate that the embodiments may be implemented to perform other types of orientation changes such as generating a mirror image or inverse of the source image, as well as other changes affecting image appearance or presentation.

Figure 10:
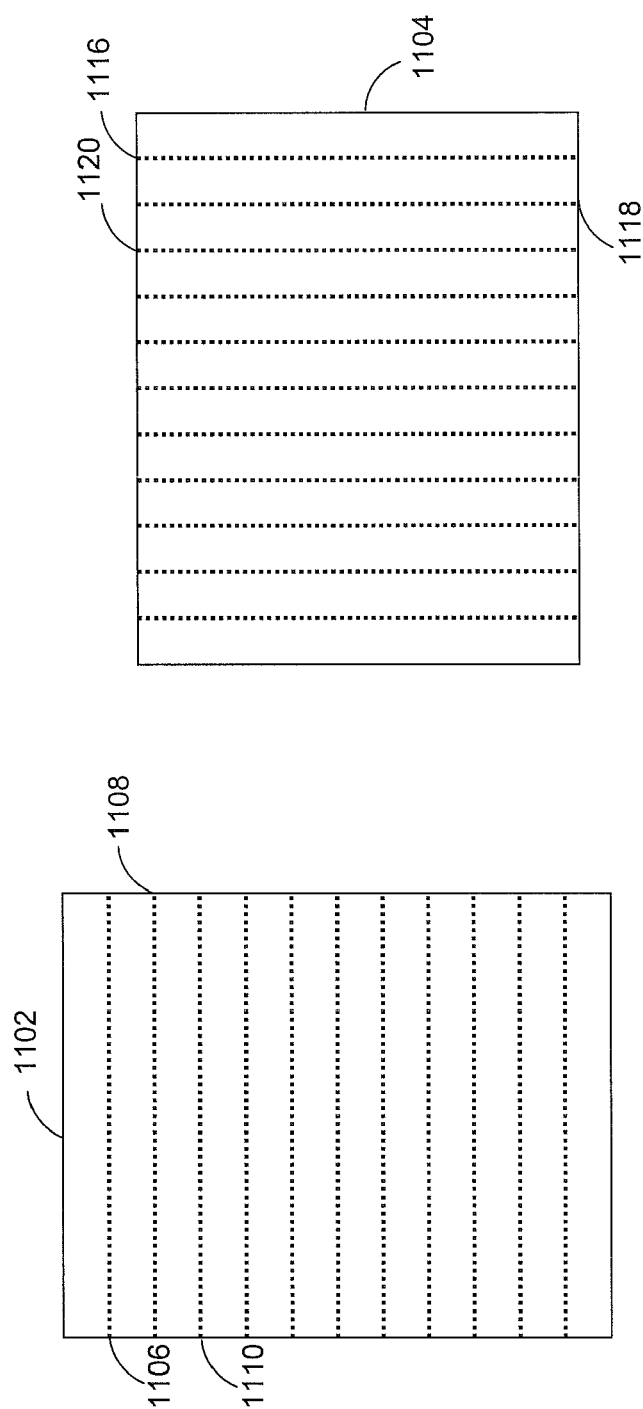
FIG. 10 is a diagram showing another image and rotated image.

FIG. 10 shows a source image 1102 and a display image 1104. The source image is stored in a source memory and comprises a plurality of lines, e.g., lines 1106, 1108, and 1110. Each line comprises a plurality of pixels. To convert the source image into the display image, the image lines in the source memory are transferred to a display memory based on specified angle of rotation. The image in the display memory is then output to a display device.

Examples of the display device include but are not limited to a Liquid Crystal Display (LCD), a plasma display panel (PDP), electroluminescent display (organic or inorganic), Thin Film Transistor (TFT) LCD, a monitor, a laptop screen and like. The image 1102 can be rotated at any desired angle, for example, 0°, 90°, 180°, or 270°. When rotated at a 270° angle, the orientation of the source image is converted into the orientation of display image 1104.

Each pixel in each of the plurality of lines of the source image is transferred sequentially to the display memory. For example, initially a line 1106 is transferred to the display memory and then the line 1108 is transferred and thereafter the line 1110 is transferred to the display memory. Each of the plurality of lines is transferred pixel by pixel, for example if each of the plurality of lines comprises 10 pixels. Then, each of the 10 pixels is transferred one by one to the display memory.

A start position of each of the plurality of lines in the display device is determined by an angle of the rotation of the image 1102. For example, if the image 1102 is rotated at the angle of rotation of 270 degree, then a line 1116 corresponds to the line 1106 and the start position of the line 1116 is decided according to the angle of rotation, similarly a line 1118 corresponds to the line 1108 and the start position of the line 1118 is determined according to the angle of rotation and a line 1120 corresponds to the line 110 and the start position of the line 1120 is determined according to the angle of rotation. The details regarding the rotation of the image 1102 will be described in conjunction with FIG. 11, FIG. 12, FIG. 13 and FIG. 14.

Figure 11:
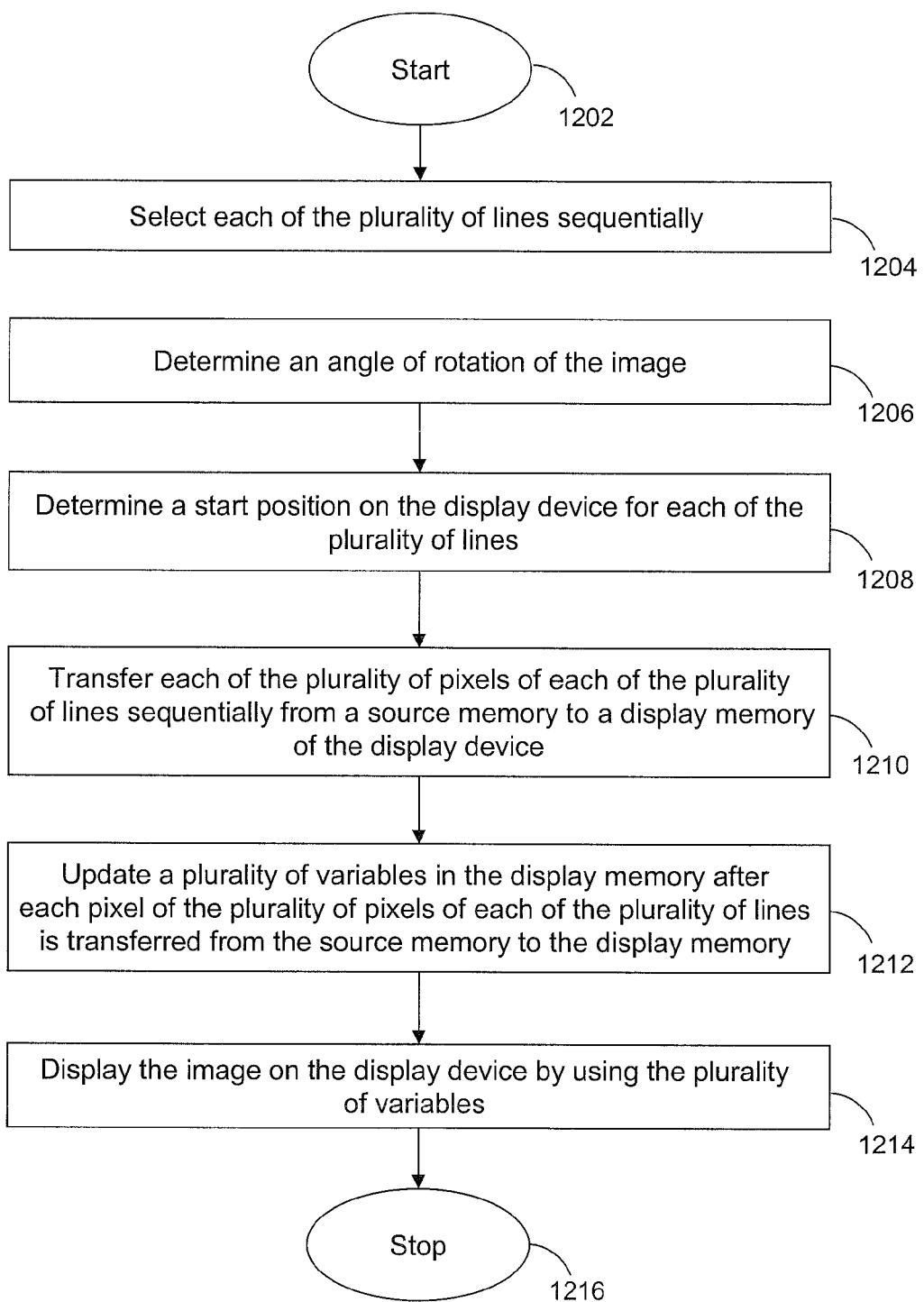
FIG. 11 is a flow diagram showing steps included in another embodiment of a method for displaying an image in a display device.

FIG. 11 shows steps in included in a method for changing the orientation of a source image for display on a display device. The source image is divided into a grid of a plurality of rows (the plurality of lines) and a plurality of columns, and each of the plurality of rows comprises a plurality of pixels. A pixel of the plurality of pixels is a basic unit of programmable color in the image. A size of the pixel of the plurality of pixels depends on a resolution of the display device. If the resolution of the display device is set to a maximum value, then the size of a pixel is equal to a physical size of a dot pitch of the display device. If, however, the resolution is set to a value less than the maximum value, then the size of the pixel will be larger than the physical size of the dot pitch or the pixel will use more than one dot on the display device.

The method is initiated at step 1202. At step 1204, each of the plurality of lines of the image to be displayed on the display device is selected sequentially, for example if the source image (e.g., 1102) rotated at the angle of rotation of 270 degree is to be displayed on the display device, then each of the plurality of lines of the image 102 is selected sequentially one by one, i.e. initially the line 1106 is selected, then the line 1108 is selected, thereafter the line 1110 is selected and so on each of the plurality of lines of the image is selected.

At step 1206, the angle of rotation of the image is determined. The angle of rotation specifies the orientation of the image in the display device. At step 1208, a start position of each of the plurality of lines is determined, the start position in the display device is determined using the angle of rotation. For example initially the start position of the line 1106 is determined and the line 1116 in the rotated image 1104 corresponds to line 1106 rotated at the angle of 270. The start position of each of the plurality of lines of the image 1102 will determined according to a plurality of variables and the angle of rotation of the image 1102, which will be described in detail in conjunction with FIG. 13 and FIG. 14.

At step 1210, each of the plurality of pixels of each of the plurality of lines is transferred to the display memory from the source memory. For example initially the plurality of pixels of the line 1106 is transferred, then each of the plurality of pixels of the line 1108 is transferred, thereafter each of the plurality of pixels of the line 1110 is transferred and so on each of the plurality of pixels of each of the plurality of lines is transferred sequentially.

At step 1212, the plurality of variables is updated, for example a screen pointer variable is updated each time a pixel is transferred from the source memory to the display memory. At step 1214, the image 1102 is displayed on the display device oriented according to the angle of rotation using the plurality of variables. For example the rotated image 1104 will be displayed on the display device when the image 1102 is rotated at the angle of 270 degree. The displaying of the image will be described in detail in conjunction with FIG. 12, FIG. 13 and FIG. 14. The method terminates at step 1216.

Figure 12:
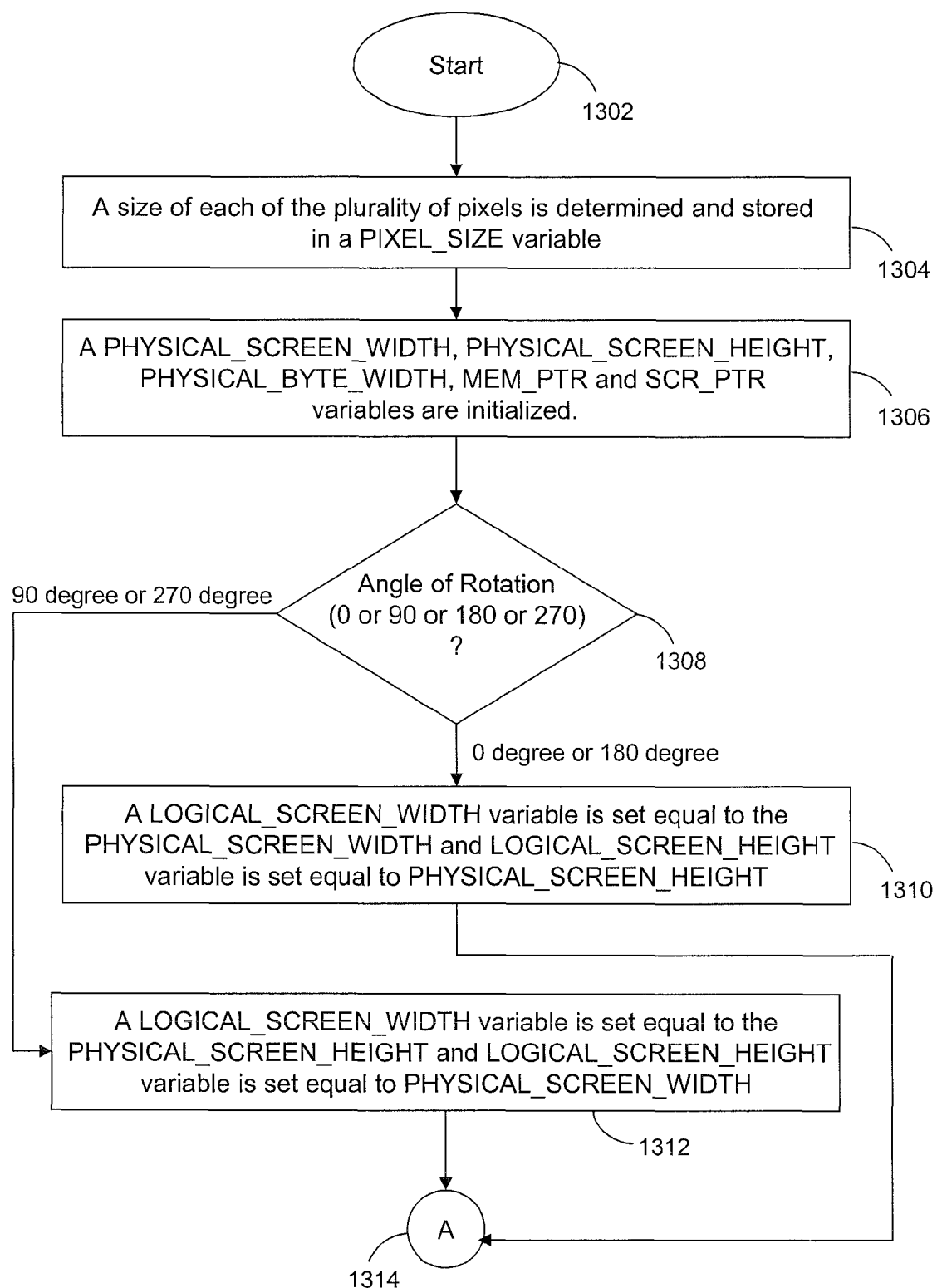
FIG. 12 is a flow diagram one way in which a plurality of variables for displaying a rotated image may be initialized.

FIG. 12 is a flow diagram illustrating one ways initialization of the plurality of variables may be performed for displaying the rotated image 1104 on the display device. The plurality of variables to be initialized includes a PIXEL_SIZE, a PHYSICAL_SCREEN_WIDTH, a PHYSICAL_SCREEN_HEIGHT, a PHYSICAL_BYTE_WIDTH, a MEM_PTR, a SCR_PTR, a LOGICAL_SCREEN_WIDTH and a LOGICAL_SCREEN_HEIGHT.

The method initiates at step 1302, when a request for displaying the image 1102 on the display screen is received by a driver program code. The request for displaying the image 1102 on the display screen can be send by an application program, an operating system, or a user defined program interface. The request for displaying the image 1102 in rotated format is processed by the driver program code. At step 1304, a size of each of the plurality of pixels of each of the plurality of lines of the image 1102 is determined and the size of each of the plurality of pixels is stored in the PIXEL_SIZE variable.

The number of bits used to represent each pixel determines how many colors or shades of gray can be displayed. For example, in 8-bit color mode, 8 bits are assigned for each pixel of the plurality of pixels, thereby making it possible to display up to 8th power of 2 (256) different colors or shades of gray of the image 1102. The size of the pixel can be selected by a user of the display device, the application program, or the operating system. The size of each of the plurality of pixels can be set to one of a 1 byte per pixel (Palette Mode), 2 bytes per pixel (High color Mode), 3 bytes per pixel (True color Packaged Mode), or 4 bytes per pixel (True color aligned Mode). At step 1306, the PHYSICAL_SCREEN_WIDTH variable is set equal to width in pixels of the image 1102 in the source memory, for example if each line comprises 10 pixels, then the PHYSICAL_SCREEN_WIDTH variable is set to 10.

Further, at step 1306, the PHYSICAL_SCREEN_HEIGHT variable is set equal to a height in pixels of the image 1102 in the source memory, for example if each column of the image 1102 comprises 10 pixels, then the PHYSICAL_SCREEN_HEIGHT variable is set to 10. Furthermore, the PHYSICAL_BYTE_WIDTH variable is set equal to a product of the PHYSICAL_SCREEN_WIDTH variable and the PIXEL_SIZE variable, for example if the PIXEL_SIZE variable is set equal to 1 byte and the PHYSICAL_SCREEN_WIDTH variable is set to 10, then the PHYSICAL_BYTE_WIDTH variable will be equal to 10 bytes. Also, at step 1306, the MEM_PTR variable is set equal to a base address to a bitmap in the source memory and the SCR_PTR variable (the screen pointer variable) is set equal to a base address of the display memory of the display device.

At step 1308, it is determined whether the angle of rotation of the image 1102 is equal to 0 degree or 90 degree or 180 degree or 270 degree. If the angle of rotation of the image 1102 is one of a 0 degree or a 180 degree, then control goes to step 1310 and at step 1310, the LOGICAL_SCREEN_WIDTH variable is set equal to the PHYSICAL_SCREEN_WIDTH variable and the LOGICAL_SCREEN_HEIGHT variable is set equal to the PHYSICAL_SCREEN_HEIGHT variable. The control goes to 1314 after the step 1310.

At step 1308, if the angle of rotation of the image 1102 is one of a 90 degree or a 270 degree, then the control goes to step 1312 and at step 1312, the LOGICAL_SCREEN_WIDTH variable is set equal to the PHYSCIAL_SCREEN_HEIGHT variable and the LOGICAL_SCREEN_HEIGHT variable is set equal to the PHYSICAL_SCREEN_WIDTH variable. The control goes to 1314 after the step 1312. At 1314, it is determined whether the angle of the rotation of the image 1102 is 0 degree, 90 degree, 180 degree or 270 degree. If the angle of the rotation of the image is 0 degree or 180 degree, then the control goes to a step 1402, in a flow diagram which will be described in conjunction with FIG. 13. If the angle of the rotation of the image is 90 degree or 270 degree, then the control goes to a step 1502, in a flow diagram which will be described in conjunction with FIG. 14.

Figure 13A:
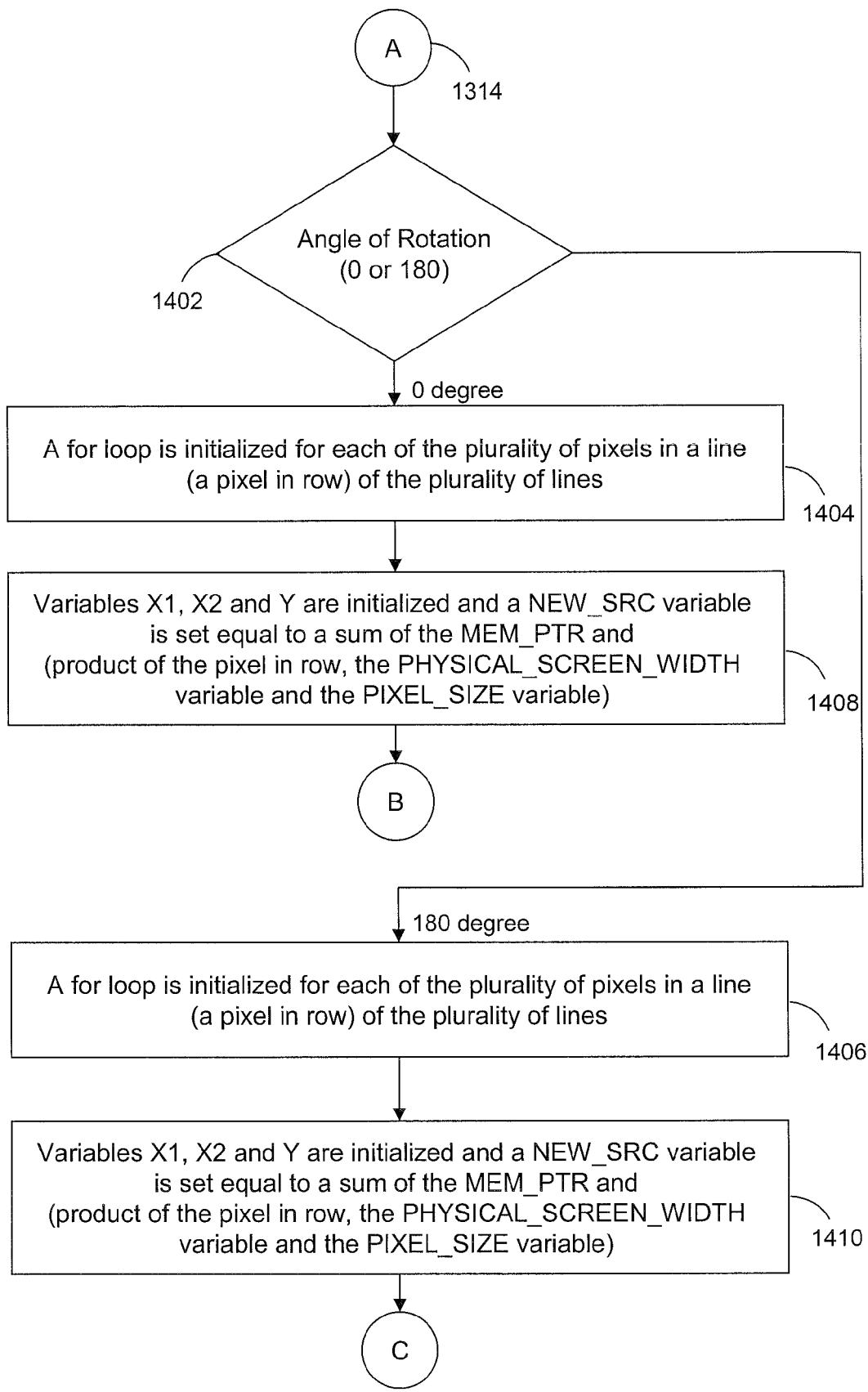
FIGS. 13A-13B are flow diagrams showing steps included in an algorithm for rotating a source image at an angle of 0° or 180°.
Figure 13B:
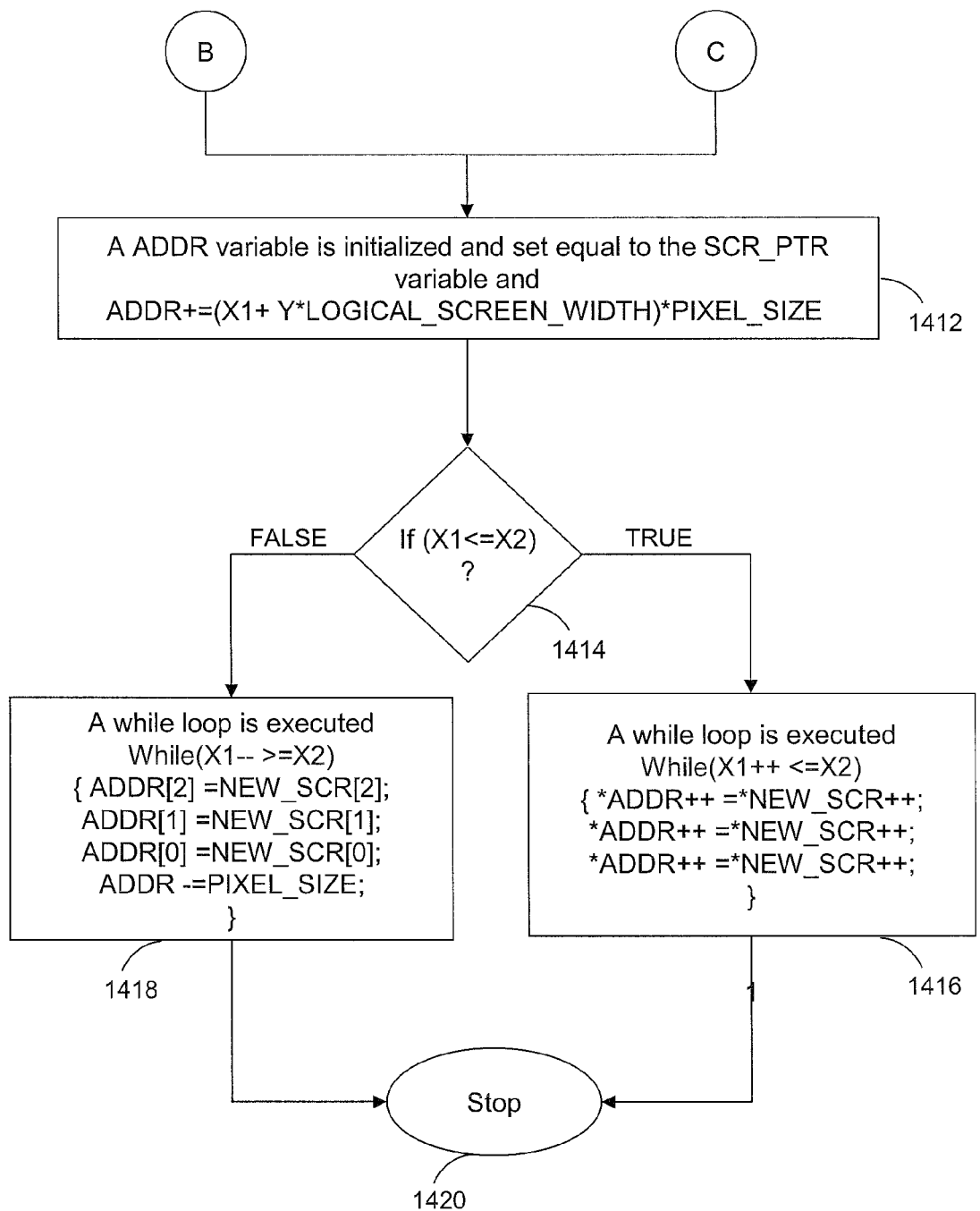

FIGS. 13A and 13B are flow diagrams illustrating an algorithm for rotation of the image 1102 at the angle of a 0 degree or the angle of 180 degree. If the angle of the rotation of the image 1102 is 0 degree or 180 degree, then control goes to step 1402. At step 1402, it is determined whether the angle of rotation is 0 degree or 180 degree. If the angle of rotation of the image 1102 is 0 degree, then control goes to step 1404, otherwise if the angle of rotation of the image is 180 degree, then control goes to step 1406.

At step 1404, for loop is initialized for each of the plurality of pixels in a line (a pixel in row) of the plurality of lines, and at step 408, variables X1, X2, Y are initialized. The coordinates (X1, Y) indicates a start position of a line of the plurality of lines of the image 1102, when the image 1102 is rotated at the angle of 0 degree.

The coordinates (X2, Y) indicates an end position of the line of the plurality of lines of the image 1102, when the image is rotated at the angle of 0 degree. X1 is set equal to 0, X2 is set equal to PHYSICAL_SCREEN_WIDTH−1, Y is set equal to a pixel in row. Further, a NEW_SRC variable is initialized and set equal to a sum of the MEM_PTR and (product of the pixel in row, the PHYSICAL_SCREEN_WIDTH variable and the PIXEL_SIZE variable).

If at step 1402, it is determined that the angle of rotation of the image 1102 is 180 degree, then at step 1406, for loop is initialized for each of the plurality of pixels in a line (a pixel in row) of the plurality of lines, and at step 1410, variables X1, X2, Y are initialized. The coordinates (X1, Y) indicates a start position of a line of the plurality of lines of the image 1102, when the image 1102 is rotated at the angle of 180 degree. The coordinates (X2, Y) indicates an end position of the line of the plurality of lines of the image 1102, when the image is rotated at the angle of 180 degree. X1 is set equal to PHYSICAL_SCREEN_WIDTH−1, X2 is set equal to 0, Y is set equal to the PHYSICAL_SCREEN_HEIGHT−the pixel in row−1. Further, the NEW_SRC variable is initialized and set equal to a sum of the MEM_PTR and (product of the pixel in row, the PHYSICAL_SCREEN_WIDTH variable and the PIXEL_SIZE variable). The step 1410 is performed for rotating the image 1102 at the angle of 180 degree.

After, the step 1408 and the step 1410, the control goes to step 1412 and an ADDR variable is initialized and set equal to the SCR_PTR variable. The ADDR variable will be set equal to the sum of a previous value in the ADDR variable and a product of the PIXEL_SIZE variable and (sum of X1, product of Y and LOGICAL_SCREEN_WIDTH variable). Thereafter, at step 1414, it is determined whether X1<=X2, and if the X1 is less than or equal to X2, then the control goes to step 1416. If the X1 is less than X2, this indicates that each of the plurality of pixels are not transferred for a particular line of a plurality of lines to the display memory, therefore at step 1416, a while loop is executed. While X1++ is less than or equal to X2, then the value of *ADDR (value stored at the ADDR variable) is incremented by 1 and the value * NEW_SRC (value stored at the NEW_SCR variable) is incremented by 1. The said operation is repeated thrice.

When the control flows out of while loop in the step 1416, then the control goes to the step 1420 and the method is terminated. If at step 1414, it is determined that X1>X2, then control goes to step 1418. At step 1418 a while loop is executed. While X1 is greater than or equal to X2, the value of X1 is decremented, when the said condition is true, then the value stored at the ADDR+2 variable is assigned a value stored at a the NEW_SCR+2 variable. Further the value stored at the ADDR+1 variable is assigned a value stored at the NEW_SCR+1 variable and the value stored at the ADDR variable is assigned a value stored at the NEW_SCR variable.

Furthermore, the variable ADDR is set equal to a difference of a previous memory location pointed by the ADDR variable and the PIXEL_SIZE variable. When, the control flows out of the while loop in step 1418, then the method is terminated at step 1420. The step 1412, 1414, 1416 and 1418 are used for transferring each of the plurality of lines (rows) of the image sequentially from the source memory to the display memory. Each of the plurality of lines is transferred by transferring each of the plurality of pixels of each of the plurality of lines sequentially. Initially the line 1106 is transferred to the display memory, and if each of the plurality of lines comprises 10 pixels, then the ADDR variable will be incremented 10 times, since the X2 variable will be set equal to PHYSICAL_SCREEN_WIDTH−1, the PHYSICAL_SCREEN_WIDTH variable is set equal to the width in pixels of the image, the width in pixels of the image is equal to number of pixels in each of the plurality of lines. Once each of the plurality of lines is transferred to the display device, then the image rotated at a particular angle is displayed at the display device, by updating the plurality of variables as described above.

Figure 14A:
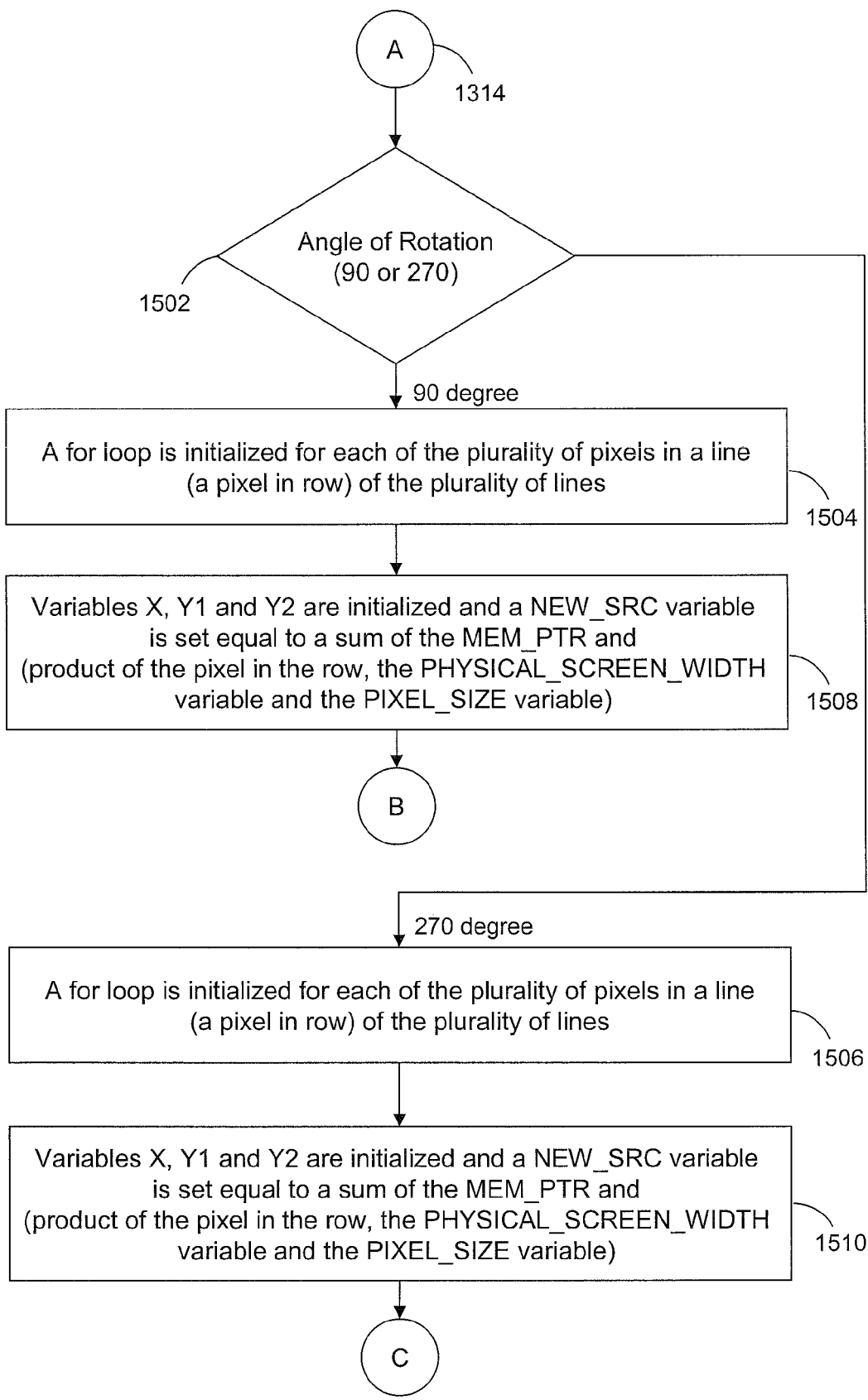
FIGS. 14A-14B are flow diagrams showing steps included in an algorithm for rotating a source image at angles of 90° or 270°.
Figure 14B:
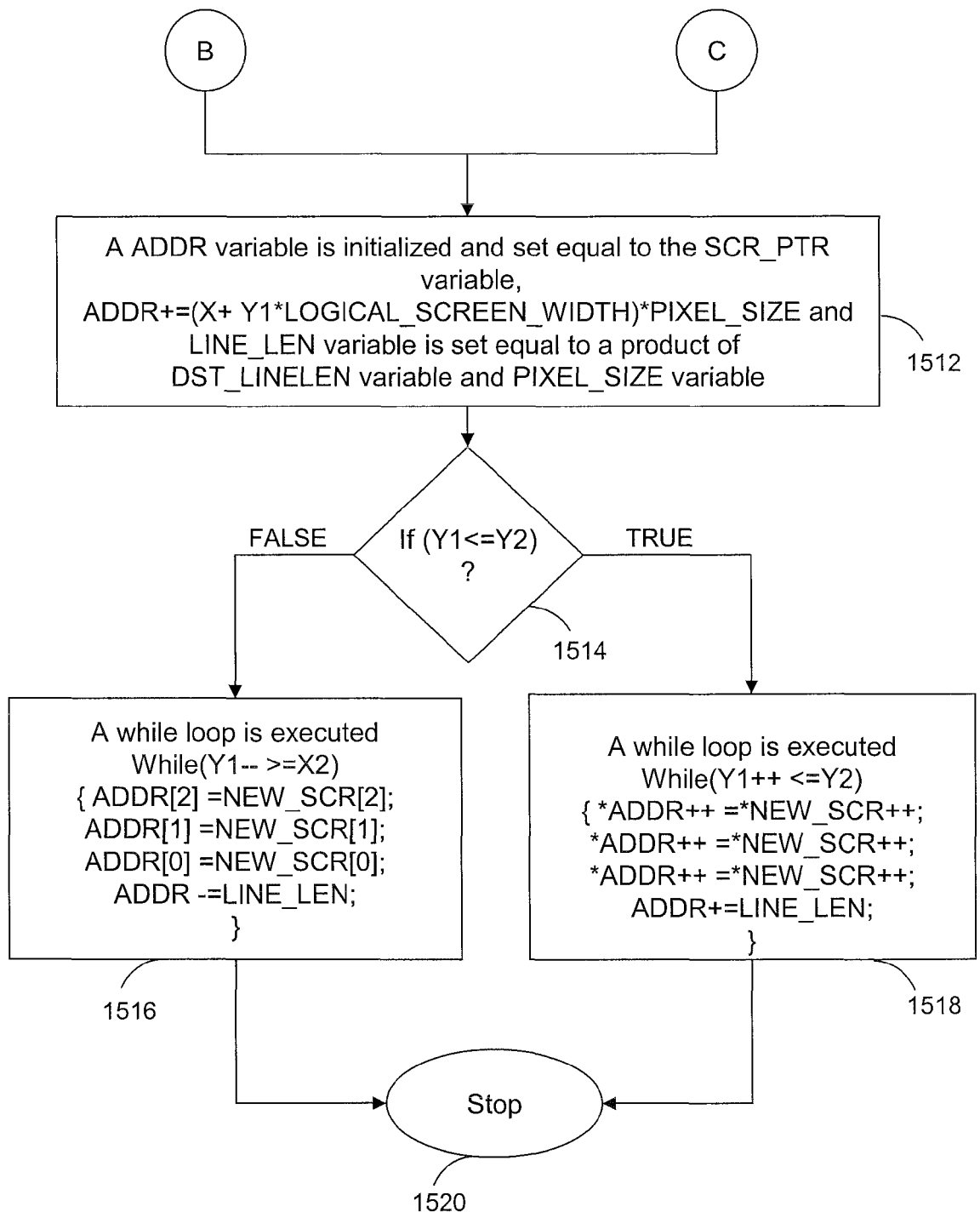

FIGS. 14A and 14B are flow diagrams illustrating an algorithm for rotation of the image 1102 at the angle of a 90 degree or the angle of 270 degree. If the angle of the rotation of the image 1102 is 90 degree or 270 degree, then control goes to step 1502. At step 1502, it is determined whether the angle of rotation of the image 1102 is 90 degree or 270 degree. If the angle of rotation of the image 1102 is 90 degree, then control goes to step 1504, otherwise if the angle of rotation of the image is 270 degree, then control goes to step 1506.

At step 1504, for loop is initialized for each of the plurality of pixels in a line (a pixel in row) of the plurality of lines, and at step 1508, variables X, Y1, Y2 are initialized. The coordinates (X, Y1) indicates a start position of a line of the plurality of lines of the image 1102 to be transferred to the display memory, when the image 1102 is rotated at the angle of rotation of 90 degree.

The coordinates (X, Y2) indicates an end position of the line of the plurality of lines of the image 1102, when the image is rotated at the angle of rotation of 90 degree. X is set equal to the pixel in a row. Y1 is set equal to PHYSICAL_SCREEN_WIDTH−1, Y2 is set equal to 0. Further, the NEW_SRC variable is initialized and set equal to a sum of the MEM_PTR and (product of the pixel in row, the PHYSICAL_SCREEN_WIDTH variable and the PIXEL_SIZE variable).

If at step 1502, it is determined that the angle of rotation of the image 1102 is 270 degree, then at step 1506, for loop is initialized for each of the plurality of pixels in a line (a pixel in row) of the plurality of lines, and at step 1510, variables X, Y1, Y2 are initialized. The coordinates (X, Y1) indicates a start position of the line of the plurality of lines of the image 1102, when the image 1102 is rotated at the angle of 270 degree.

The coordinates (X, Y2) indicates an end position of the line of the plurality of lines of the image 1102, when the image is rotated at the angle of 270 degree. X is set equal to PHYSICAL_SCREEN_HEIGHT–the pixel in a row–1, Y1 is set equal to 0 and Y2 is set equal to the PHYSICAL_SCREEN_WIDTH–1. Further, the NEW_SRC variable is initialized and set equal to a sum of the MEM_PTR and (product of the pixel in row, the PHYSICAL_SCREEN_WIDTH variable and the PIXEL_SIZE variable). The step 1510 is performed for rotating the image 1102 at the angle of rotation of 270 degree. The image 1102, when rotated at the angle of rotation of 270 degree, then the image 1102 is oriented as shown with reference to the rotated image 1104.

After, the step 1508 and the step 1510, the control goes to step 1512 and the ADDR variable is initialized and set equal to the SCR_PTR variable. The ADDR variable will be set equal to the sum of a previous value in the ADDR variable and a product of PIXEL_SIZE and (sum of X, product of Y1 and the LOGICAL_SCREEN_WIDTH variable). Further, a LINE_LEN variable is initialized and set equal to a product of DST_LINELEN variable and the PIXEL_SIZE variable.

Thereafter, at step 1514, it is determined whether Y1<=X2, and if the Y1 is less than or equal to Y2, then the control goes to step 1518. If Y1 is less than Y2, this indicates that each of the plurality of pixels are not transferred for a particular line of a plurality of lines to the display memory, therefore at step 1518, a while loop is executed. While Y1++ is less than or equal to Y2, then the value of *ADDR (value stored at the ADDR variable) is incremented by 1 and the value *NEW_SRC (value stored at the NEW_SCR variable) is incremented by 1. The said operation is repeated thrice. Furthermore, the ADDR variable is set equal to a sum of a previous memory location pointed by the ADDR variable and the LINE_LEN variable.

When the control flows out of while loop in the step 1518, then the control goes to step 1520 and the method is terminated. If at step 1514, it is determined that Y1>Y2, then control goes to step 1516. At step 1516 a while loop is executed. While Y1 is greater than or equal to Y2, the value of Y1 is decremented, when the said condition is true, then the value stored at the ADDR+2 variable is assigned a value stored at the NEW_SCR+2 variable. Further the value stored at the ADDR+1 variable is assigned a value stored at the NEW_SCR+1 variable, the value stored at the ADDR variable is assigned a value stored at the NEW_SCR variable.

Furthermore, the variable ADDR is set equal to a difference of a previous memory location pointed by the ADDR variable and the LINE_LEN variable. When the control flows out of the while loop in step 1516 then the method is terminated at step 1520. The step 1512, 1514, 1516 and 1518 are used for transferring each of the plurality of lines (rows) of the image 1102 sequentially pixel by pixel to the display memory from the source memory. Each of the plurality of lines is transferred by transferring each of the plurality of pixels of each of the plurality of lines. Once each of the plurality of lines is transferred to the display device, then the image rotated at a particular angle is displayed at the display device, by updating the plurality of variables as described above.

In accordance with other embodiments, a method and a computer program product for transferring the image from the source memory to the display memory of the display device. These embodiments do not use predefined increment values and transfers each of the plurality of lines sequentially to the display memory. Each of the plurality of lines is transferred pixel by pixel to the display memory. The driver program code changes the orientation of the image in a plurality of modes, and does way with a need of having a different program code for each of the plurality of modes, therefore leading to a decreased usage of memory space in the display memory.

One or more of the foregoing embodiments may be implemented in the form of a computer-implemented process and apparatus. The embodiments described herein may also be implemented in computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the embodiments described herein.

The embodiments can also be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the embodiments herein. When implemented on a general-purpose microprocessor, the computer program code segments configure the microprocessor to create specific logic circuits.

The present invention is described herein in connection with a number of exemplary embodiments. However, the invention is not intended to be limited to the specific forms set forth herein. It is understood that various omissions, substitutions of equivalents are contemplated as circumstances may suggest or render expedient, but is intended to cover the application or implementation without departing from the spirit or scope of the claims of the present invention. Also, it is to be understood that the phraseology and terminology used herein is for the purpose of description and should not be regarded as limiting.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with varous modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

What is claimed is:

1. A method for displaying an image in a display device, comprising:
  (a) generating a list of non-sequential random numbers, each number corresponding to a respective one of a plurality of lines in a source image;
  (b) selecting a first random number from the list;
  (c) transferring the line in the source image that corresponds to the first random number from a source memory to a display memory based on orientation change information;

(d) automatically determining a second random number from the list based on selection of the first random number;

(e) transferring the line in the source image that corresponds to the second random number from the source memory to the display memory based on said orientation change information; and (f) repeating (b)-(e) for remaining random numbers in the list until all remaining lines in the source image are transferred from the source memory to the display memory based on said orientation change info nation.

2. The method of claim 1, wherein different pairs of adjacent random numbers in said list are separated by different incremental values.

3. The method of claim 2, wherein transferring said lines from the source memory to the display memory includes: controlling a memory pointer of the source memory and a memory pointer of the display memory based on said different incremental values.

4. The method of claim 1, wherein:
the lines in the source memory are divided into first and second sections relative to a reference point in the source image, and wherein each line in the first section has a mirror image line in the second section, the source image transferred into the display memory based on the division of lines in the first and second sections.

5. The method of claim 4, wherein, in (d), the second random number is automatically determined to correspond to the mirror image of the first random number relative to said reference point.

6. The method of claim 4, wherein the reference point is located between two lines in the source image.

7. The method of claim 4, wherein the reference point coincides with a line in the source image.

8. The method of claim 4, wherein the first section includes lines in a first half of the source image and the second section includes lines in a second half of the source image.

9. The method of claim 1, wherein said orientation change information designates a desired angle of rotation of the source memory to be displayed on a screen of the display device.

10. The method of claim 1, wherein pointers in the source and display memories are controlled based on an order of selection of random numbers from said list.

11. The method of claim 10, wherein random numbers are sequentially selected from the list to control a random order of transfer of images lines in the source image from the source memory to the display memory.

12. The method of claim 1, wherein pixels in each line in the source image are sequentially transferred from the source memory to the display memory based on said orientation change information.

13. The method of claim 1, further comprising:
dividing the source image into first and second sections relative to a reference point, wherein:
each image line in the first section of the source image has a corresponding mirror image line in the second section of the source image,
the first random number selected from the list corresponds to an image line of the first section of the source image,
the second random number corresponds to a mirror image line in the second section of the source image, the mirror image line corresponding to a mirror image line of the image line in the first section corresponding to the first random number.

14. A system for displaying an image in a display device, comprising:
a first memory to store a source image;
a second memory to store a display image; and
a processor to control transfer of the source image from the first memory to the second memory, the processor changing an orientation of the source image by:

(a) generating a list of non-sequential random numbers, each number corresponding to a respective one of a plurality of lines in the source image;

(b) selecting a first random number from the list;

(c) transferring the image line in the source image that corresponds to the first random number from the source memory to the display memory based on orientation change information;

(d) automatically determining a second random number from the list based on selection of the first random number;

(e) transferring the image line in the source image that corresponds to the second random number from the source memory to the display memory based on said orientation change information; and (f) repeating (b)-(e) for remaining random numbers in the list until all remaining image lines in the source image are transferred from the source memory to the display memory based on said orientation change information.

15. The system of claim 14, wherein the processor generates random numbers so that different pairs of adjacent random numbers in said list are separated by different incremental values.

16. The system of claim 15, wherein transferring said image lines from the source memory to the display memory includes: controlling a memory pointer of the source memory and a memory pointer of the display memory based on said different incremental values.

17. The system of claim 14, wherein:
the image lines in the source memory are divided into first and second sections relative to a reference point in the source image, and wherein each image line in the first section has a mirror image line in the second section, the source image transferred into the display memory based on the division of image lines in the first and second sections.

18. The system of claim 17, wherein, in (d), the processor automatically determines that the second random number corresponds to the mirror image of the first random number relative to said reference point.

19. The system of claim 17, wherein the reference point is located between two image lines in the source image.

20. The system of claim 17, wherein the reference point coincides with an image line in the source image.

21. The system of claim 17, wherein the first section includes image lines in a first half of the source image and the second section includes image lines in a second half of the source image.

22. The system of claim 17, wherein said orientation change information designates a desired angle of rotation of the source memory to be displayed on a screen of the display device.

23. The system of claim 14, wherein pointers in the source and display memories are controlled based on an order of selection of random numbers from said list.

24. The system of claim 23, wherein random numbers are sequentially selected from the list to control a random order of transfer of images lines in the source image from the source memory to the display memory.

25. The system of claim 14, wherein the processor sequentially transfers pixels in each line of the source image from the source memory to the display memory based on said orientation change information.

26. A non-transitory computer readable medium comprising instructions for:
(a) generating a list of non-sequential random numbers, each number corresponding to a respective one of a plurality of lines in a source image;
(b) selecting a first random number from the list;
(c) transferring the image line in the source image that corresponds to the first random number from a source memory to a display memory based on orientation change information;
(d) automatically determining a second random number from the list based on selection of the first random number;
(e) transferring the image line in the source image that corresponds to the second random number from the source memory to the display memory based on said orientation change information; and
(f) repeating (b)-(e) for remaining random numbers in the list until all remaining image lines in the source image are transferred from the source memory to the display memory based on said orientation change information.

27. The non-transitory computer readable medium of claim 26, wherein different pairs of adjacent random numbers in said list are separated by different incremental values.

28. The non-transitory computer readable medium of claim 27, wherein transferring said image lines from the source memory to the display memory includes: controlling a memory pointer of the source memory and a memory pointer of the display memory based on said different incremental values.

29. A method for controlling display of an image, comprising:
generating a list of non-sequential random numbers, each number corresponding to a respective one of a plurality of lines in a source image;
transferring the lines in the source image from a first memory to a second memory based on orientation change information, the lines in the source image transferred in non-sequential order using the random numbers in said list; and displaying an image based on the image lines in the second memory.

30. The method of claim 29, wherein all pixels in each line are transferred before pixels in any subsequent line are transferred to the second memory.

31. The method of claim 29, wherein the lines in the source image are transferred to the second memory by controlling a pointer of at least the first memory, and wherein different incremental values are used to control movement of the pointer when transferring different lines of the source image from the first memory to the second memory.

* * * * *